United States Patent
Kullangal Sridhara et al.

(10) Patent No.: US 9,264,374 B2
(45) Date of Patent: *Feb. 16, 2016

(54) MEDIA PLAYOUT FOR VOIP APPLICATIONS

(71) Applicant: QUALCOMM Incorporated, San Diego, CA (US)

(72) Inventors: Dinesh Kullangal Sridhara, San Diego, CA (US); Siddharth Ryan Franco, San Diego, CA (US); Mark Aaron Lindner, Verona, WI (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/061,418

(22) Filed: Oct. 23, 2013

(65) Prior Publication Data

US 2015/0110103 A1    Apr. 23, 2015

(51) Int. Cl.
*H04L 12/863* (2013.01)
*H04L 12/861* (2013.01)
*H04L 29/06* (2006.01)

(52) U.S. Cl.
CPC .......... *H04L 47/6255* (2013.01); *H04L 49/90* (2013.01); *H04L 49/9005* (2013.01); *H04L 65/604* (2013.01); *H04L 65/80* (2013.01)

(58) Field of Classification Search
CPC .......... H04L 47/32; H04L 47/74; H04L 47/30
See application file for complete search history.

(56) References Cited

U.S. PATENT DOCUMENTS

| | | | |
|---|---|---|---|
| 5,276,681 | A | 1/1994 | Tobagi et al. |
| 6,822,940 | B1 * | 11/2004 | Zavalkovsky et al. ........ 370/237 |
| 7,768,919 | B1 | 8/2010 | Conway |
| 7,957,323 | B2 | 6/2011 | Uyehara et al. |
| 8,238,341 | B2 * | 8/2012 | Ho ................... 370/394 |
| 2004/0090917 | A1 * | 5/2004 | Ruutu et al. .................. 370/235 |
| 2004/0190537 | A1 | 9/2004 | Ferguson et al. |
| 2005/0094563 | A1 | 5/2005 | Takeshita et al. |
| 2005/0207437 | A1 | 9/2005 | Spitzer |
| 2005/0238013 | A1 | 10/2005 | Tsuchinaga et al. |
| 2006/0039393 | A1 * | 2/2006 | Firoiu et al. .................. 370/412 |
| 2007/0230493 | A1 | 10/2007 | Dravida et al. |

(Continued)

OTHER PUBLICATIONS

Azami S B.Z., et al., "Evaluating the Effects of Buffer Management on Voice 22 Transmission Over Packet, Switching Networks", ICC 2001. 2001 IEEE International Conference on Communications. Conference Record, Helsinky, Finland, Jun. 11-14, 2001, [IEEE International Conference on Communications], New York, NY, IEEE, US, vol. 3, Jun. 11, 2001 pp. 738-742, XP919553199.

(Continued)

*Primary Examiner* — Paul H Masur
*Assistant Examiner* — Kabir Jahangir
(74) *Attorney, Agent, or Firm* — The Marbury Law Group, PLLC

(57) ABSTRACT

In overview, the various embodiments include methods performed by a receiver device processor for implementing one or more buffer space management strategies to free up space in the buffer in response to determining that the buffer is full. In the various embodiments, the receiver device processor may analyze media packets stored in the buffer based on various criteria to identify media packets that may be discarded without significantly impacting playout sound quality to free space in the buffer for incoming packets.

28 Claims, 16 Drawing Sheets

(56) References Cited

U.S. PATENT DOCUMENTS

| | | | | |
|---|---|---|---|---|
| 2008/0279102 | A1* | 11/2008 | Sankaran et al. | 370/235 |
| 2009/0040929 | A1* | 2/2009 | Lee et al. | 370/235 |
| 2010/0188977 | A1* | 7/2010 | Rochon et al. | 370/235 |
| 2012/0051366 | A1 | 3/2012 | Li et al. | |
| 2013/0258851 | A1* | 10/2013 | Mayya et al. | 370/235 |
| 2014/0204749 | A1* | 7/2014 | Sabato et al. | 370/235 |
| 2015/0109925 | A1 | 4/2015 | Kullangal et al. | |

OTHER PUBLICATIONS

International Search Report and Written Opinion—PCT/US2014/061840—ISA/EPO—Feb. 4, 2015.

Jayasumana Colorado State University N Piratla Deutsche Telekom Labs T Banka Colorado State University A Bare R Whitner Agilent TE: "Improved Packet Reordering Metrics; rfc5236.txt", Jun. 1, 2008, XP015057215,ISSN: 0000-0003.

\* cited by examiner

MEDIA PLAYOUT FOR VOIP APPLICATIONS

RELATED APPLICATIONS

This application is related to U.S. patent application Ser. No. 14/061,375 entitled "Improved Media Playout for VOIP Applications" filed concurrently herewith.

BACKGROUND

Voice over IP (or voice over Internet Protocol "VoIP") is a methodology and group of technologies for the delivery of voice communications and multimedia sessions over Internet Protocol (IP) networks, such as the Internet. VoIP is available on many smartphones, personal computers, and on Internet-accessible devices. For example, a smartphone user may make calls and SMS text messages through VoIP over a 3G or Wi-Fi network.

VoIP technologies enable media streaming over IP networks using special media delivery protocols that encode voice, audio, video, etc. as sequential packets of data. Typically, the media content is split into multiple packets of media data that are sent from an originating device to a receiving device. Each media packet includes a sequence number that is used when determining the order of playout on the receiving device.

The receiving device may receive the media packets individually or in a burst (i.e., several packets sent as a group), the latter usually occurring when there is a network delay/backlog in packet delivery. The receiving device stores media packets in a buffer of a fixed size for play out in sequential order. After finishing playing a media packet, the receiving device removes the media packet from the buffer to make room for other media packets. Occasionally, given the limited space in the buffer, the receiver device will discard or reject new media packets that are received when the playout buffer is full or when the receiver device does not have the resources to process the media packets because other tasks have a higher priority (which is sometimes referred to as "task preemption"). This may especially be the case when the media packets arrive in a burst, which increases the likelihood that the buffer cannot hold every media packet in the burst or that the receiver device can process every packet in the burst.

SUMMARY

In a variety of circumstances, a receiver device's buffer for storing media packets may become full with received packets awaiting playout such that incoming packets must be rejected because there is no space in which to store those packets. In this situation, the receiver device's voice playback may be significantly degraded because numerous packets must be rejected.

To resolve such performance issues, the various embodiments include methods performed by a processor on a receiver device for implementing one or more buffer space management strategies to free up space in the receiver device's buffer in response to determining that the buffer is full or nearly full. In the various embodiments, the receiver device processor may identify and discard packets stored in the buffer or buffering means that may be discarded without significantly impacting the quality of audio playout to free space in the buffer for incoming packets.

In an embodiment buffer space management strategy, the receiver device processor may preemptively reject packets that include silence or comfort noise data when the buffer space is full/constrained, and the processor may only attempt to store packets including meaningful audio data (e.g., voice data). In another buffer space management strategy embodiment, the receiver device processor may discard packets already stored in the buffer that include silence or comfort noise data to make space available for incoming packets that include voice data.

In an embodiment buffer space management strategy, the receiver device processor may determine a pattern of redundant data that a codec has included in a stream of packets received by the device. The receiver device processor may discard packets stored in buffer slots next to packets that include redundant data because the redundant data may enable the receiver device processor to at least partially recover data in those discarded packets through error correction interpolation. In an embodiment, the receiver device may determine the pattern of redundant data, either by identifying information regarding the redundant data included in the packet or by analyzing media packets over a period of time.

In another embodiment buffer space management strategy, the receiver device processor may discard packets in the buffer based on an estimated ratio of speech to comfort noise data that is expected to occur in the near future. Based on the estimated ratio, the receiver device processor may discard packets in the buffer with a particular aggressiveness (e.g., discarding more packets in the buffer when there is a high volume of voice data expected to arrive).

In another embodiment buffer space management strategy, the receiver device processor may discard additional media packets in the buffer based on the granularity of slots in the buffer in response to determining that the space in the buffer is still constrained after earlier attempts to free space in the buffer.

In another embodiment buffer space management strategy, the receiver device processor may discard all of the packets included in a section of the buffer when the section includes a certain percentage of erasures (e.g., packets that were lost or received with too many errors to be recovered). In other words, when a sequence of packets includes a substantial number of erasures or missing packets, playout of that sequence of packets may be unacceptable regardless of the quality of the data stored in the buffer, and the receiver device processor may free considerable space in the buffer by discarding all of the packets in the section without significantly impacting the quality of audio playout.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
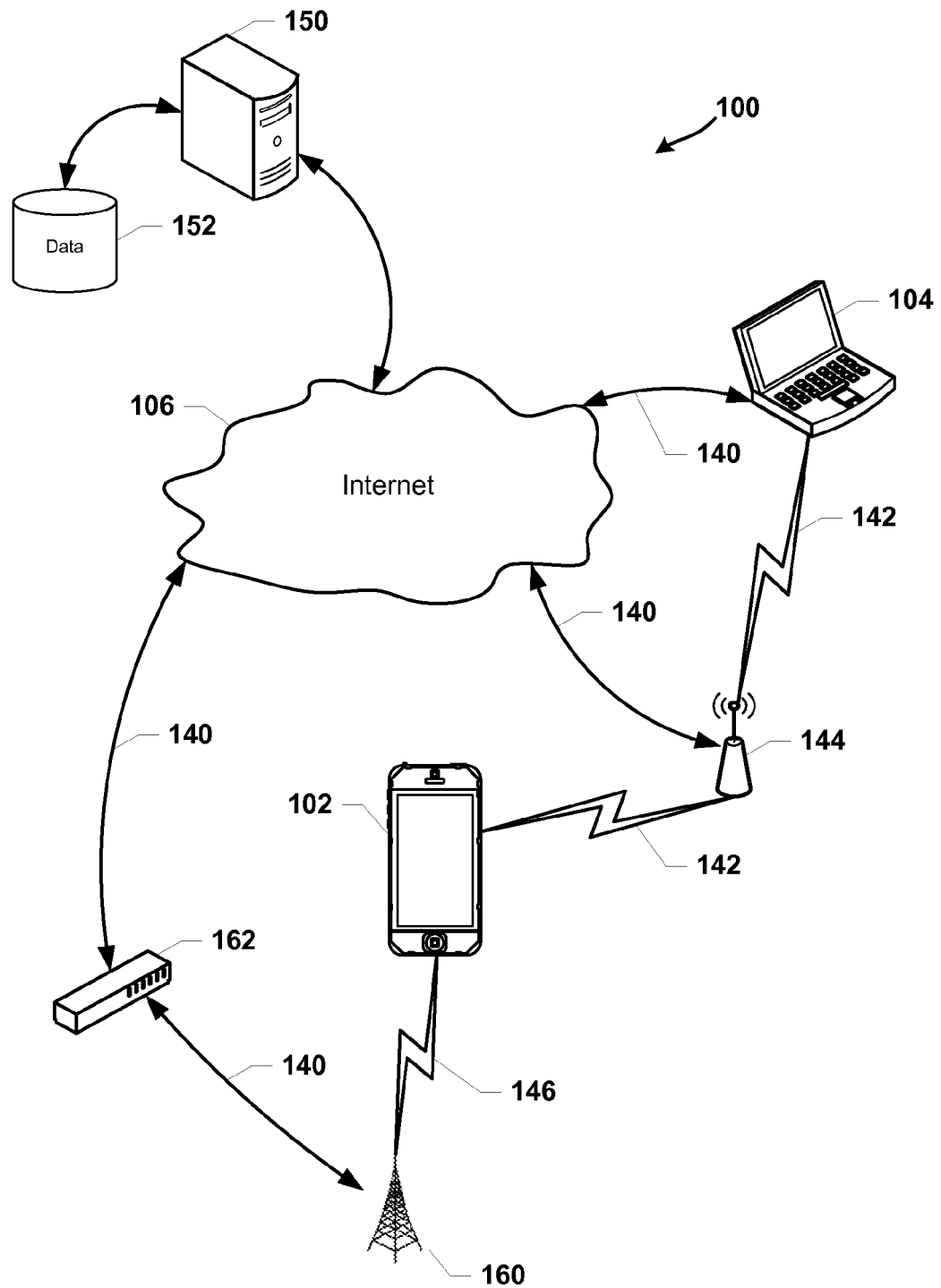
FIG. 1 is a communication system block diagram of VoIP networks suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "receiver device" refers to any one or all of cellular telephones, smart phones, personal or mobile multi-media players, personal data assistants, laptop computers, personal computers, tablet computers, smart books, palm-top computers, wireless electronic mail receivers, multimedia Internet enabled cellular telephones, wireless gaming controllers, and similar personal electronic devices which individually include a programmable processor, a buffer memory, and circuitry for connecting to a communication network. The various aspects may be useful in mobile computing devices, such as smart phones, and so such devices are referred to in the descriptions of the various embodiments. However, the embodiments may be useful in any electronic devices configured to receive data packets via a VoIP communication system.

VoIP typically functions as a best-effort protocol without fundamental Quality of Service (QoS) guarantees, and communication on an IP network is often less reliable than other networks (e.g., circuit-switched public telephone networks) because VoIP does not provide a network-based mechanism to ensure that data packets are received on the receiving device or delivered in sequential order. Thus, VoIP implementations may suffer "choppy" playback that occurs when some media packets are unavailable for playback because media packets are lost in transit from the originating device and/or because the receiving device has rejected the media packets upon arrival.

A conventional VoIP receiver device does not keep track of the media packets that it has rejected or failed to buffer. Consequently on occasion the receiver device may reject some more media packets received in the future unnecessarily, which can contribute to poor voice quality. In other words, a conventional receiver device may unnecessarily reject a new packet because the processor expects to receive another packet that the processor has already rejected. For example, the receiver device may have a buffer that holds five packets, but the receiver device may receive a burst of ten packets (sequentially ordered 1 to 10). In this case, the receiver device might buffer packets 1-5 and reject packets 6-10 because the buffer is too small to store all ten packets at the same time. When the receiver device receives packet 11 (i.e., the next packet in the sequence because packets 6-10 were rejected), the receiver device will needlessly reject packet 11 because the receiver device processor expects to receive packet 6, which it has rejected. This may happen even when play-out of buffered packets has freed up room in the buffer sufficient to store packet 11.

To address these and other limitations of current packet buffer management processes, a processor of a VoIP receiver device (referred to herein as a "receiver device processor") may manage media packet rejections on the receiving device to improve audio playout. For example, the receiver device processor may perform operations to enhance the likelihood that a receiver device will buffer (rather than reject) an incoming media packet by maintaining a history of previously rejected media packets (i.e., a packet rejection history) and referencing the packet rejection history when determining whether to reject or to accept an incoming packet the receiver device has just received. However, regardless of how the receiver device processor manages storing packets in the buffer, the processor may occasionally need to reject an incoming packet because the buffer is full, which may tend to occur more frequently on receiver devices with smaller memory capacity.

In overview, the various embodiments include methods performed by a receiver device processor for implementing one or more buffer space management strategies to free up space in the buffer in response to determining that the buffer is full. In the various embodiments, the receiver device processor may identify and discard packets stored in the buffer that may be discarded without significantly impacting the quality of audio playout to free space in the buffer for incoming packets.

In an embodiment, the receiver device processor may preemptively reject packets that include silence or comfort noise data when the buffer space is full/constrained, and the processor may only attempt to store packets including meaningful audio data (i.e., voice data). In another embodiment, the receiver device processor may discard packets already stored in the buffer that include silence or comfort noise data to make space available for incoming packets that include voice data.

In an embodiment, the receiver device processor may determine a pattern of redundant data that a codec has included in a stream of packets received by the device. The receiver device processor may discard packets stored in buffer slots next to packets that include redundant data because the redundant data may enable the receiver device processor to at least partially recover data in those discarded packets through error correction interpolation, thereby freeing up space without sacrificing significant audio quality. In a further embodiment, the receiver device may determine the pattern of redundant data, either by identifying information regarding the redundant data included in the packet or by analyzing media packets over a period of time.

In another embodiment, the receiver device processor may discard packets in the buffer based on an estimated ratio of speech to comfort noise data that is expected to occur in the near future. Based on the estimated ratio, the receiver device processor may discard packets in the buffer with a particular aggressiveness (e.g., discarding more packets in the buffer when there is a high volume of voice data expected to arrive). In another embodiment, the receiver device processor may discard additional media packets in the buffer based on the granularity of slots in the buffer in response to determining that the space in the buffer is still constrained after earlier attempts to free space in the buffer.

In another embodiment, the receiver device processor may discard all of the packets included in a section of the buffer when the section includes a certain percentage of erasures (i.e., packets that were lost in the network). In other words, when a sequence of packets includes a substantial number of erasures or missing packets, playout of that sequence of packets may be unacceptable regardless of the quality of the data stored in the buffer, and the receiver device processor may free considerable space in the buffer by discarding all of the packets in the section without significantly impacting the quality of audio playout.

The embodiment methods may be implemented in software and executed by the receiver device processor, which may be any processing unit—such as a CPU, DSP, logic circuit, etc.—included in the receiver device. The receiver device processor may implement the buffer in various data structures. For example, the buffer may be implemented as a look-up table or hashtable. In another example, the buffer may be a circular hashtable in which the first entry in the circular hashtable at any given time is the media packet currently being played.

FIG. 1 illustrates a network system 100 suitable for use with the various embodiments. The network system 100 may include multiple receiver devices 102, 104, which may include smart phones, personal computers, and/or laptop computers.

In an embodiment, a first receiver device 102 and second receiver device 104 may be configured to receive packets (e.g., VoIP data packets) from a network such as the Internet 106 via wireless connections 142 established through a wireless access point 144. The wireless access point 144 may connect with the Internet 106 through a wired connection 140. In another embodiment, the first receiver device 102 may receive packets via a cellular connection 146 (e.g., CDMA, TDMA, GSM, PCS, 3G, 4G, LTE, etc.) with a cellular tower or base station 160. The cellular tower or base station 160 may be in communication with a router 162 which may connect to the Internet 106. In another embodiment, the second receiver device 104 may receive data packets via a wired connection 140 to the Internet 106.

In an embodiment, the first and second receiver devices 102, 104 may receive data packets that originate from other receiver devices and/or from servers, such as VoIP server 150. The VoIP server 150 may be configured to manage and deliver data packets via a connection to the Internet 106 and may be configured to have access to a database 152.

Figure 2:
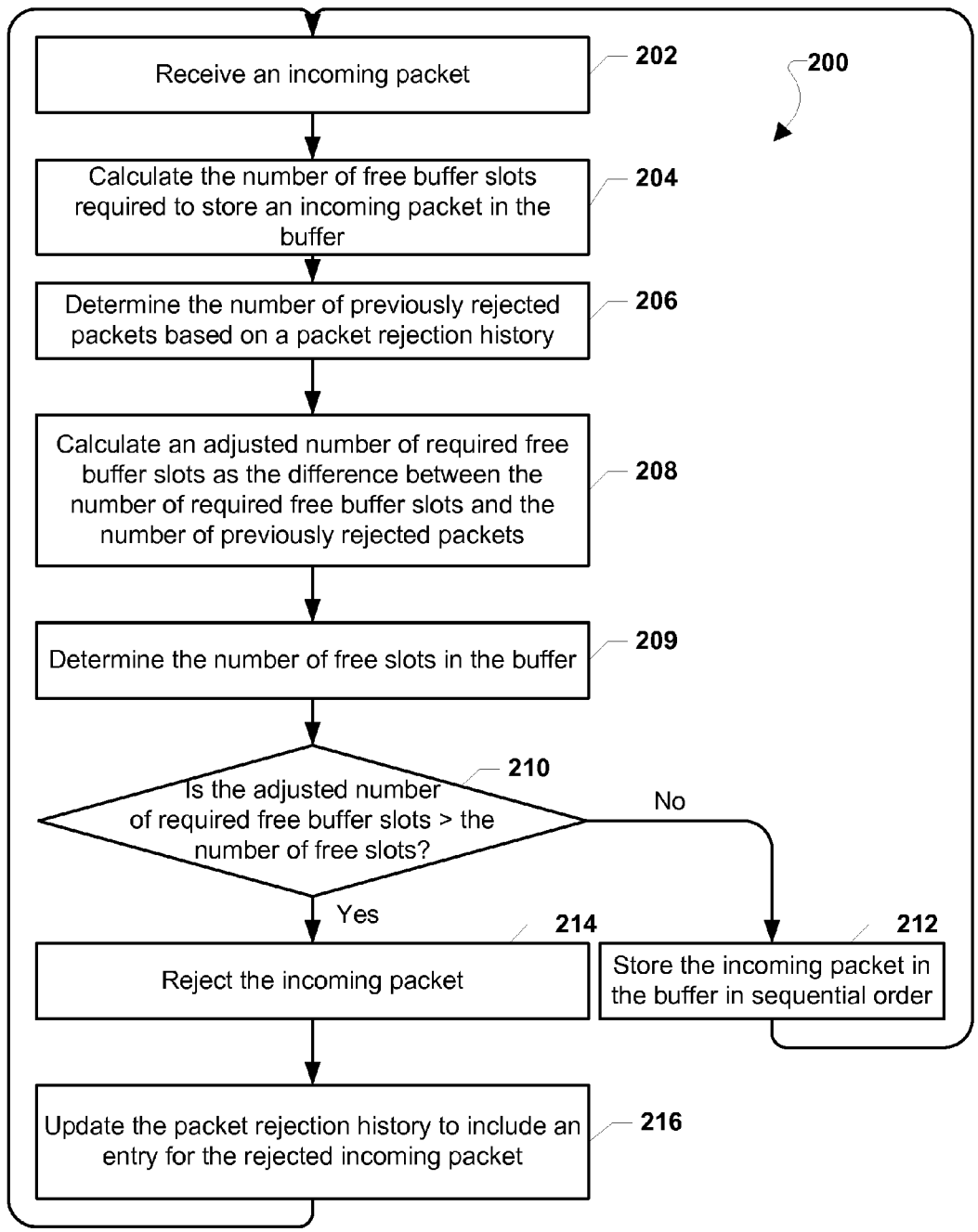
FIG. 2 is a process flow diagram of an embodiment method for managing a packet buffer.

FIG. 2 illustrates an embodiment method 200 that may be implemented on a receiver device processor for improve media playout from a buffer by utilizing a packet rejection history. In contrast to conventional methods of buffer management, the operations of method 200 may enable the receiver device processor to allocate space in the playout buffer for incoming packets more effectively by accounting for previously rejected packets that the device will never store in the buffer.

In an embodiment, the receiver device may receive an incoming packet in block 202, such as directly from an originating device or from a server (e.g., VoIP server 150 described above with reference to FIG. 1). As described above, media packets include metadata—including sequence numbers—that enables a receiver device processor to determine the order in which the media packet should be played to ensure coherent playout.

In some circumstances, the receiver device may receive an incoming packet out of order because of delay in delivering packets earlier in the sequence. For example, in a sequence of seven packets the receiver device may receive and store the seventh packet before receiving the fifth packet in the sequence. In other circumstances, an incoming packet may be included as part of a burst of packets, (i.e., a series of more than one packet received within a short period of time), and the receiver device may process the packets in the burst one at a time in the order of their arrival.

In block 204, the receiver device processor may calculate the number of free buffer slots required to store the incoming packet in the buffer. In an embodiment, the receiver device may include a buffer of a finite size that includes indexed slots for storing media packets. Because buffered media packets should be played in sequential order, the receiver device processor may store media packets in the buffer in sequential order. For example, a fourth packet in a sequence may be stored in a slot in the buffer after a buffer slot storing a third packet in the sequence and before the buffer slot storing the fifth packet in the sequence. Thus, in block 204, the receiver device processor may calculate the number of required free buffer slots as the number of buffer slots after the buffer slot storing the last-buffered packet required to store the incoming packet in order to preserve the sequential order. The operations performed in block 204 are further described below with reference to FIG. 3.

The receiver device processor may determine the number of previously rejected packets since the last-buffered packet based on a packet rejection history in block 206. In this operation, the receiver device processor may count the number of rejected packets in the packet rejection history that have sequence numbers between the sequence number of the last-buffered packet and the sequence number of the incoming packet. The number of rejected packets may indicate the number of slots in the buffer that are additionally available for storing incoming packets as further described below with reference to FIG. 4.

In block 208, the receiver device processor may calculate an adjusted number of free buffer slots required to store the incoming packet in the buffer as the difference between the number of required free buffer slots calculated in block 204 and the number of previously rejected packets determined in block 206. Specifically, because one or more packets may have been received and rejected between the last-buffered packet and the incoming packet, the number of free buffer slots needed to store the incoming packet may be less than the number of required free buffer slots calculated in block 204. For example, the receiver device may only need one free buffer slot to store packet 5 between packet 3 and packet 6 when the processor has previously rejected packet 4. As another example, the receiver device may only need one free buffer slot to store packet 6 after packet 3 when the processor has previously rejected packets 4 and 5. The receiver device processor may also determine the actual number of free slots in the buffer in block 209 using known methods.

In determination block 210, the receiver device processor may determine whether the adjusted number of required free buffer slots calculated in block 208 exceeds the actual number of free slots in the buffer determined in block 209 in order to assess whether the buffer has sufficient space to store the incoming packet. In other words, the receiver device processor may assess whether there is enough space available to store the incoming packet in the buffer after discounting previously rejected packets.

When the receiver device processor determines that the adjusted number of required free buffer slots exceeds the actual number of free slots in the buffer (i.e., determination block 210="Yes"), the processor may reject the incoming packet in block 214. In this event, the buffer may be full, such as when the rate of playout is slower than the rate in which the receiver device receives incoming packets. In another embodiment, the buffer may not be full, but the receiver device processor may still reject the incoming packet because the processor may anticipate receiving other packets out of order and may be saving slots in the buffer for those out-of-order packets.

After rejecting the incoming packet in block 214, the receiver device processor may update the packet rejection history to include an entry for the rejected incoming packet in block 216. In other words, the receiver device processor may keep an ongoing record of the packets that it has rejected. In an embodiment, the receiver device processor may update the packet rejection history to reflect the current state of the buffer, such as by changing the pointers in a packet rejection history and/or by recording that the incoming packet was rejected in a lookup table or circular buffer.

When the receiver device processor determines that the adjusted number of required free buffer slots does not exceed the actual number of free slots in the buffer (i.e., determination block 210="No"), the receiver device processor may store the incoming packet in the buffer in sequential order in block 212. In an embodiment, by performing the above operations, the receiver device processor may store the incoming packet in the buffer while leaving free slots in the buffer for storing out-of-order packets that may arrive later.

In another embodiment, the adjusted number of required free buffer slots may also represent the index/location of a slot in the buffer relative to the last-buffered packet's slot, and the receiver device processor may store the incoming packet in a buffer slot associated with that slot index as further described below with reference to FIG. 5. For example, the last-buffered packet may have a sequence number of 5. If the receiver device receives an incoming packet with a sequence number of 8 and determines that the adjusted number of required free slots in the buffer is two, the processor may store the incoming packet in a buffer slot that is two slots after the last-buffered packet's slot.

In an embodiment, after either updating the rejection history to include an entry for the rejected incoming packet in block 216 or storing the incoming packet in the buffer in block 212, the receiver device processor may repeat the operations described above for subsequent incoming packets, thereby improving media playout by creating a higher likelihood that the receiver device stores (instead of rejects) each incoming packet in the buffer.

Figure 3:
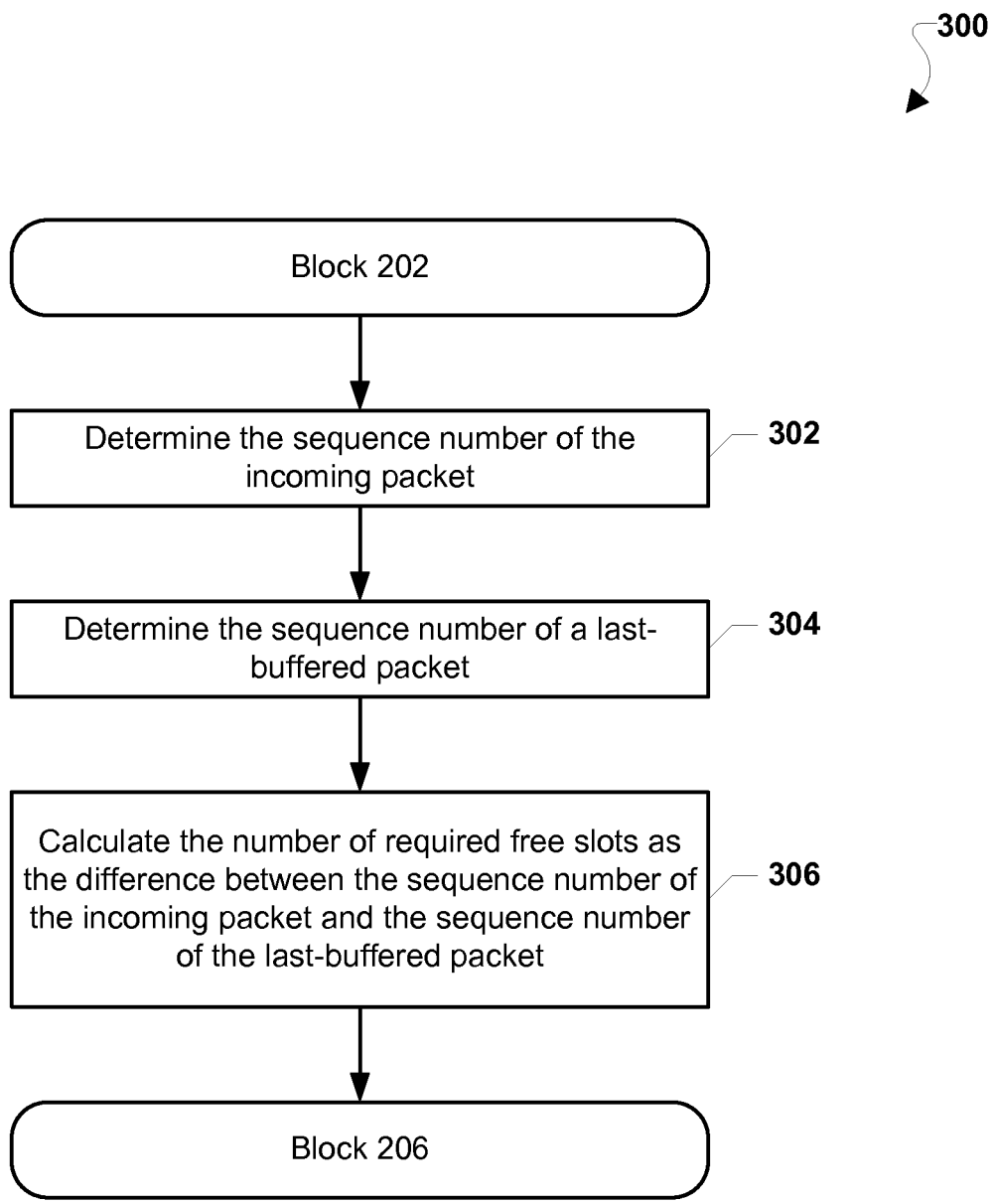
FIG. 3 is a process flow diagram of an embodiment method for calculating the number of free buffer slots required to store an incoming packet in a buffer.

FIG. 3 illustrates an embodiment method 300 that may be implemented on a receiver device processor for calculating the number of free buffer slots required to store an incoming packet in the device's playout buffer. The operations of method 300 may implement an embodiment of the operations of block 204 of method 200 described above with reference to FIG. 2.

After receiving an incoming packet in block 202 of method 200, the receiver device processor may determine the sequence number of the incoming packet in block 302. As described above, the incoming packet may include metadata including the packet's sequence number. The receiver device processor may also determine the sequence number of a last-buffered packet in block 304 using similar techniques.

The receiver device processor may calculate the number of required free buffer slots to store the incoming packet as the difference between the sequence number of the incoming packet and the sequence number of the last-buffered packet in block 306. In an embodiment, this calculation may produce an index value for a buffer slot relative to the last-buffered packet to which the incoming packet must be stored to preserve the sequential order in the buffer. For example, when the last-buffered packet has a sequence number of 12 and the incoming packet has a sequence number of 15, the incoming packet may need to be stored in a buffer slot that has an index that is three more (e.g., 15−12=3) than the slot index of the last-buffered packet in order to save room for packets 13 and 14.

However, as described above with reference to FIG. 2, the number of required free buffer slots may be an inaccurate representation of the number of buffer slots actually needed to store the incoming packet when intervening packets have been rejected, because the number of required buffer slots may factor in out of sequence packets that have not been received because they were rejected and, therefore, do not need a buffer slot saved for them. To account for such previously rejected packets, the receiver device processor may determine the number of previously rejected packets in block 206 of method 200 as described above with reference to FIG. 2.

Figure 4:
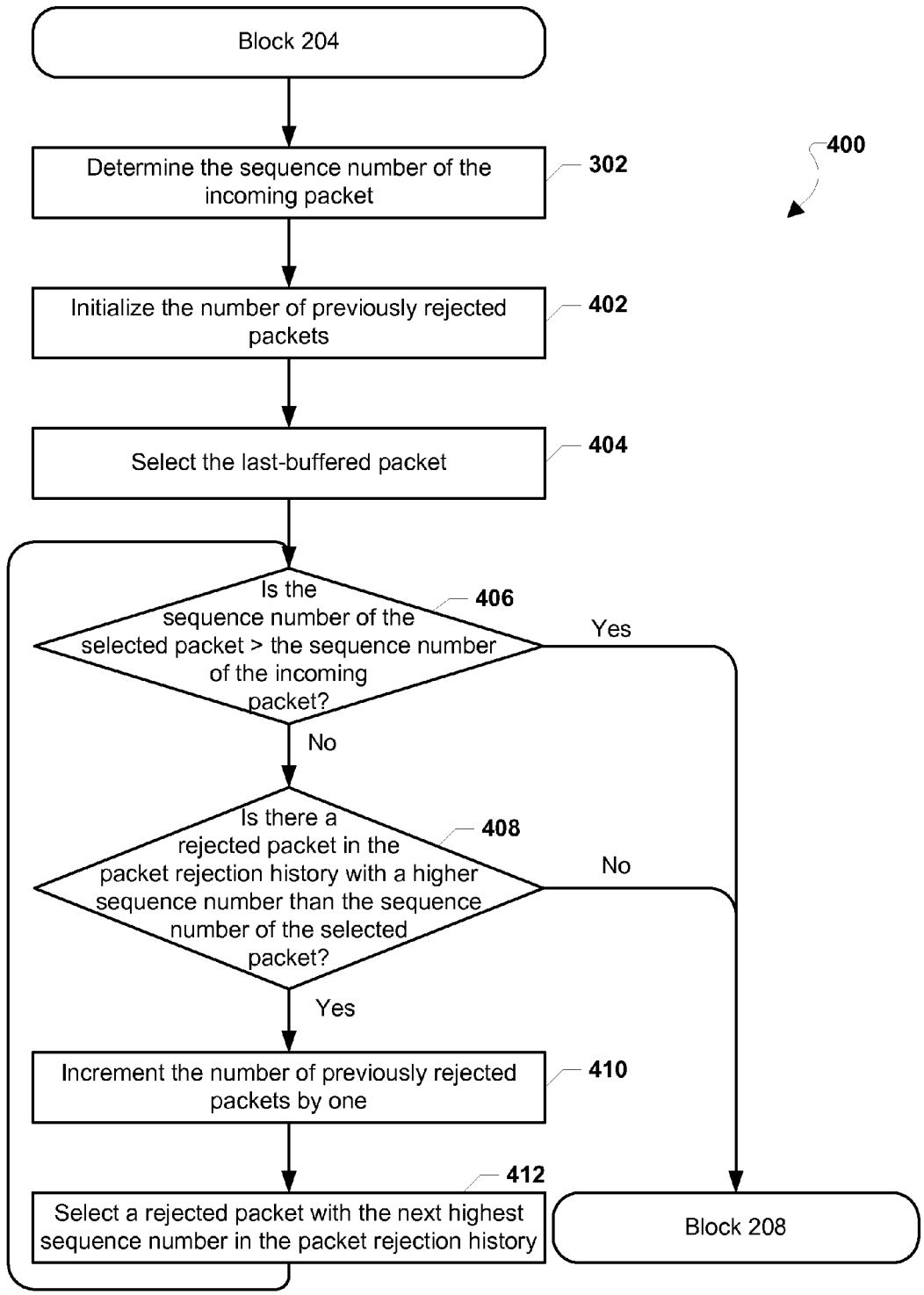
FIG. 4 is a process flow diagram of an embodiment method for determining a number of previously rejected media packets in a packet rejection history.

FIG. 4 illustrates an embodiment method 400 that may be implemented on a receiver device processor for determining the number of packets rejected after the last-buffered packet in sequential order. The operations of method 400 may implement an embodiment of the operations of block 206 of method 200 described above with reference to FIG. 2. The receiver device processor may begin performing method 400 after calculating the number of free slots in the buffer required to store the incoming packet in block 204 of method 200.

In block 302, the receiver device processor may determine the sequence number of the incoming packet, as described above with reference to FIG. 3. The receiver device processor may also initialize the number of previously rejected packets in block 402. In an embodiment, the receiver device processor may utilize the number of previously rejected packets as a counter while traversing the packet rejection history, and thus may initially set the number of previously rejected packets to be equal to zero. The receiver device processor may also use the number of previously rejected packets to adjust the number of required free buffer slots (as described above with reference to FIG. 2) to account for packets that have been rejected (i.e., packets that will never be stored in the buffer).

The receiver device processor may begin counting the number of previously rejected packets in the packet rejection history by selecting the last-buffered packet in block 404. In an embodiment, the receiver device processor may traverse the packet rejection history starting from the last-buffered packet's sequence number and count the number of packets that have been rejected between the last-buffered packet and the incoming packet based on the packets' sequential order.

In determination block 406, the receiver device processor may determine whether the sequence number of the selected packet exceeds the sequence number of the incoming packet as determined in block 302. In an embodiment, the receiver device processor may make this determination to identify when it has finished counting previously rejected packets with sequence numbers between those of the last-buffered packet and the incoming packet.

When the receiver device processor determines that the sequence number of the selected packet exceeds the sequence number of the incoming packet (i.e., determination block 406="Yes"), the process may calculate the adjusted number of required free buffer slots in block 208 of method 200 as described above with reference to FIG. 2. In an example, the receiver device processor may make such a determination when the incoming packet has a sequence number less than the sequence number of the last-buffered packet (e.g., when the incoming packet is received out of order) or when the processor has selected a rejected packet that has a sequence number that exceeds the incoming packet's sequence number.

When the receiver device processor determines that the sequence number of the selected packet does not exceed the sequence number of the incoming packet (i.e., determination block 406="No"), the processor may determine whether there is a rejected packet in the packet rejection history with a higher sequence number than the sequence number of the selected packet in determination block 408. In other words, the receiver device processor may determine whether there are more rejected packets in the packet rejection history between the last-buffered packet and the incoming packet to count.

When the receiver device processor determines that there are no rejected packets in the packet rejection history with a higher sequence number than the sequence number of the selected packet (i.e., determination block 408="No"), the processor may calculate the adjusted number of required free buffer slots in block 208 of method 200 as described above with reference to FIG. 2 because there may be no more rejected packets in the packet rejection history to count between the last-buffered packet and the incoming packet.

When the receiver device processor determines that there is a rejected packet in the packet rejection history with a higher sequence number than the sequence number of the selected packet (i.e., determination block 408="Yes"), the processor may increment the number of previously rejected packets by one in block 410, thereby keeping count of the total number of rejected packets between the last-buffered packet and the incoming packet. The receiver device processor may also select a rejected packet with the next highest sequence number in the packet rejection history in block 412 and may continue performing the above operations until the sequence number of the selected packet exceeds the sequence number of the incoming packet (i.e., determination block 406="Yes") or until there are no more rejected packets in the rejection packet history left to select (i.e., determination block 408="No").

Figure 5:
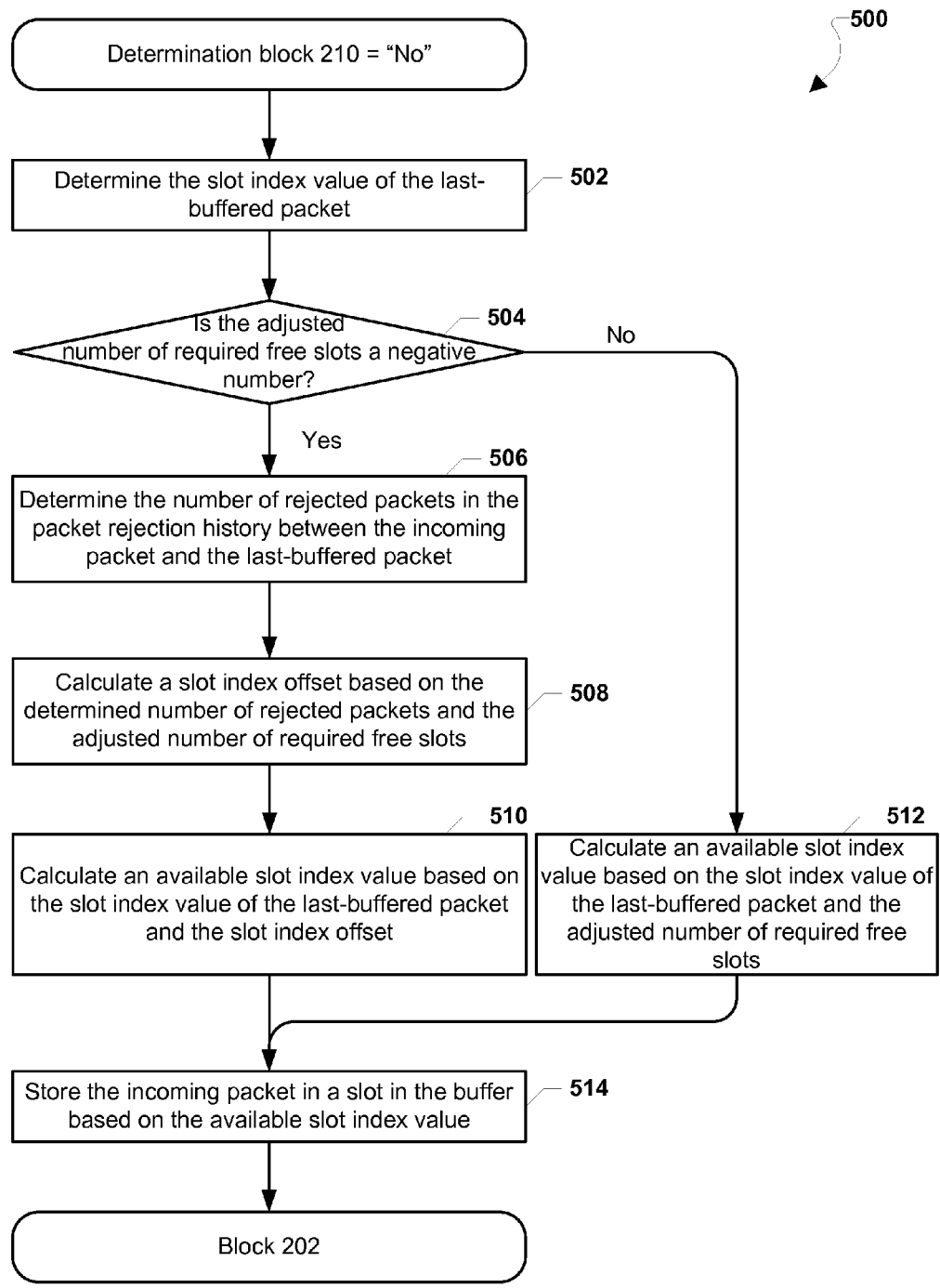
FIG. 5 is a process flow diagram of an embodiment method for storing an incoming packet in a buffer.

FIG. 5 illustrates an embodiment method 500 that may be implemented on a receiver device processor for storing an incoming packet in the buffer. The operations of method 500 implement an embodiment of the operations of block 212 of method 200 described above with reference to FIG. 2, and the receiver device processor may begin performing method 500 after determining in method 200 that the adjusted number of required free buffer slots does not exceed the actual number of free slots in the buffer (i.e., determination block 210="No").

In block 502, the receiver device processor may determine the slot index value of the last-buffered packet, which the processor may have stored as a value or pointer in memory. In other words, the receiver device processor may determine the location in the buffer in which the last-buffered packet is stored. In an embodiment, the slot index of the last-buffered packet may be a reference point by which the receiver device processor determines the slot in the buffer in which to insert an incoming packet as described below.

In determination block 504, the receiver device processor may determine whether the adjusted number of required free buffer slots is a negative number. The adjusted number of required free buffer slots may be a negative number when packets are received out of order such that the sequence number of the incoming packet is less than the sequence number of the last-buffered packet (e.g., when the receiver device receives the incoming packet out of order). In an embodiment, a negative adjusted number of required free buffer slots may indicate that the incoming packet should be stored in an earlier slot in the buffer than the last-buffered packet in order to enable sequential playout of packets, while a non-negative adjusted number of required free buffer slots may indicate that the incoming packet should be stored in a later slot in the buffer.

When the receiver device processor determines that the adjusted number of required free buffer slots is a positive number (i.e., determination block 504="No"), the processor may calculate an available slot index value based on the slot index value of the last-buffered packet and the adjusted number of required free buffer slots in block 512. In an embodiment, the available slot index may be the slot in the buffer in which the incoming packet should be stored to preserve the sequential order of the packets in the buffer. For example, when the adjusted number of required free buffer slots is four, the available slot index may point to a slot that is four buffer slots after the last-buffered packet's slot. Further, since the actual number of required free buffer slots accounts for packets that have been rejected, the receiver device processor may insert incoming packets into the buffer without saving space for packets that have been rejected. In block 514, the receiver device processor may also store the incoming packet in the buffer based on the available slot index calculated in block 512.

When the receiver device processor determines that the adjusted number of required free buffer slots is a negative number (i.e., determination block 504="Yes"), the processor may determine the number of rejected packets in the packet rejection history between the incoming packet and the last-buffered packet in block 506. In an embodiment, the receiver device processor may traverse through the packet rejection history in a manner similar to the one described above with reference to FIG. 4, such as by counting the number of rejected packets in the packet rejection history with sequence numbers higher than the incoming packet's sequence number and lower than the last-buffered packet's sequence number.

The receiver device processor may also calculate a slot index offset based on the determined number of rejected packets and the adjusted number of required free buffer slots in block 508. In an embodiment, the slot index offset may represent the number of slots before the buffer slot storing the last-buffered packet of the appropriate buffer slot in which to store the incoming packet. For example, when the incoming packet's sequence number is 10 and the last-buffered packet's sequence number is 15, the adjusted number of required free buffer slots may be −5 (i.e., −5=10−15). However, if packets 12 and 14 were previously rejected (i.e., when there are two rejected packets between the incoming packet and the last-buffered packet), the receiver device processor may not need to reserve space for packets 12 and 14. Thus, the processor may account for the rejected packets when determining the slot location within the buffer in which to store the incoming packet.

Thus to account for any rejected packets, in block 510 the receiver device processor may calculate an available slot index value based on the slot index value of the last-buffered packet as determined in block 502 and the slot index offset as determined in block 506. In an embodiment, the available slot index may be the index value of the buffer slot in which the receiver device processor should store the incoming packet to preserve sequential order as described above with reference to block 512. In the above example, the slot index offset may be "−3" (i.e., −3=2 rejected packets+−5), indicating that the incoming packet should be stored in a buffer slot that is three slots before the buffer slot in which the last-buffered packet is stored. The receiver device processor may store the incoming packet in a slot in the buffer based on the available slot index in block 514, and continue receiving incoming packets in block 202 of method 200 as described above with reference to FIG. 2.

Figure 6:
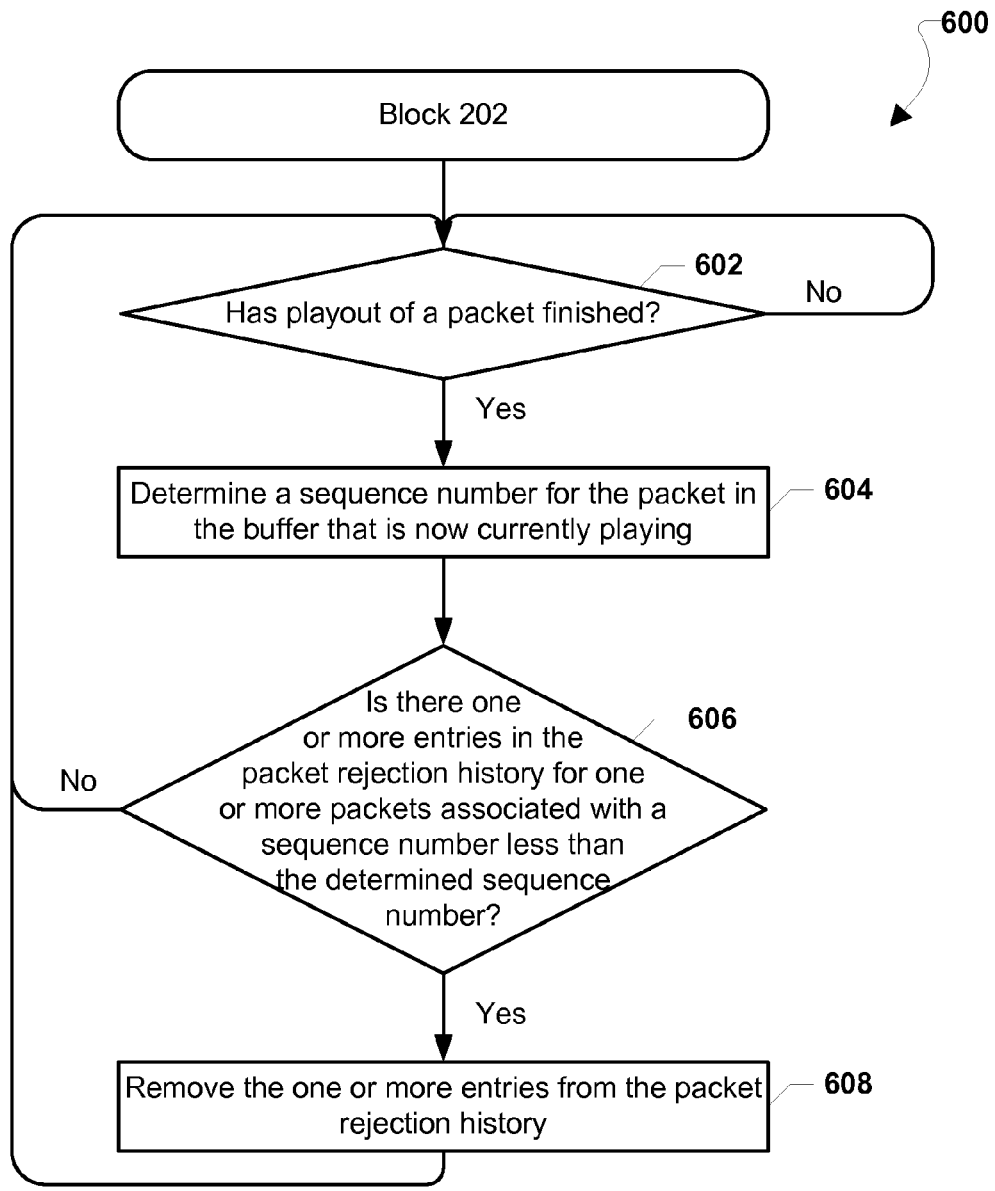
FIG. 6 is a process flow diagram of an embodiment method for managing a packet rejection history.

FIG. 6 illustrates an embodiment method 600 that may be implemented on a receiver device processor for managing a packet rejection history. The operations of method 600 may be a further embodiment of the operations of method 200 described above with reference to FIG. 2. In an embodiment, the receiver device processor may perform the operations of method 600 to keep the packet rejection history up to date and to ensure that the packet rejection history is a manageable size by removing entries that may no longer be relevant to the management of the buffer. The receiver device processor may begin performing method 600 after receiving an incoming packet in block 202 of method 200.

In determination block 602, the receiver device processor may determine whether playout of a packet has finished. For instance, the receiver device processor may monitor a packet's playout progress, such as the amount of play time remaining or the number of bytes left to play out. When the receiver device processor determines that the packet has not finished playout (i.e., determination block 602="No"), the processor may continue performing the operations in determination block 602 until the processor recognizes that playout of the packet has finished.

When the receiver device processor determines that the packet has finished playing (i.e., determination block 602="Yes"), the processor may determine the sequence number of the packet in the buffer that is currently playing. For example, the receiver device processor may reference a playlist that includes the identity of the packets in the buffer, as well as their sequence number/playing order.

The receiver device processor may also determine whether there are any (i.e., one or more) entries in the packet rejection history associated with one or more packets that have a sequence number less than the determined sequence number in determination block 606. In an embodiment, the receiver device processor may use the currently playing packet's sequence number to mark an exclusive starting boundary of the packet rejection history because information regarding packets sequentially before the currently playing packet may be irrelevant to whether incoming packets should be accepted or rejected. Thus, the receiver device processor may maintain the packet rejection history to include entries only for rejected packets with sequence numbers greater than the currently playing packet's sequence number. In another embodiment, as mentioned above, the receiver device processor may ensure that the first entry in the packet rejection history is always the rejected packet that is closest in sequential order to the packet currently being played.

When then receiver device processor determines that there no entries in the packet rejection history for one or more packets associated with a sequence number less than the determined sequence number (i.e., determination block 606="No"), the receiver device processor may repeat the process by again determining whether playout of the current packet has finished in determination block 602.

When then receiver device processor determines that there is at least one entry in the packet rejection history for one or more packets associated with a sequence number less than the determined sequence number (i.e., determination block 606="Yes"), the processor may remove all entries from the packet rejection history in block 608. In an embodiment, the receiver device processor may traverse the packet rejection history, starting with the first entry, and may remove entries associated with rejected packets having sequence numbers less than the currently playing packet's sequence number. The receiver device processor may then repeat the process by again determining whether playout of the current packet has finished in determination block 602.

Figure 7A:
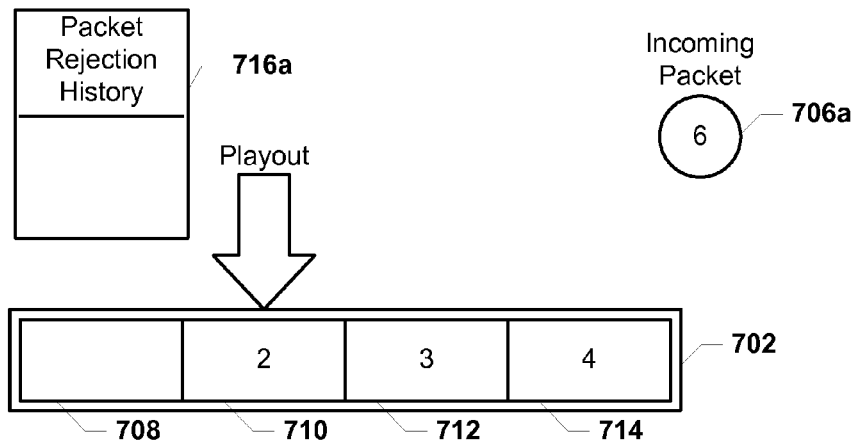
FIGS. 7A-7C are diagrams illustrating examples of accepting or rejecting incoming packets by referencing the current state of a buffer and a packet rejection history.
Figure 7B:
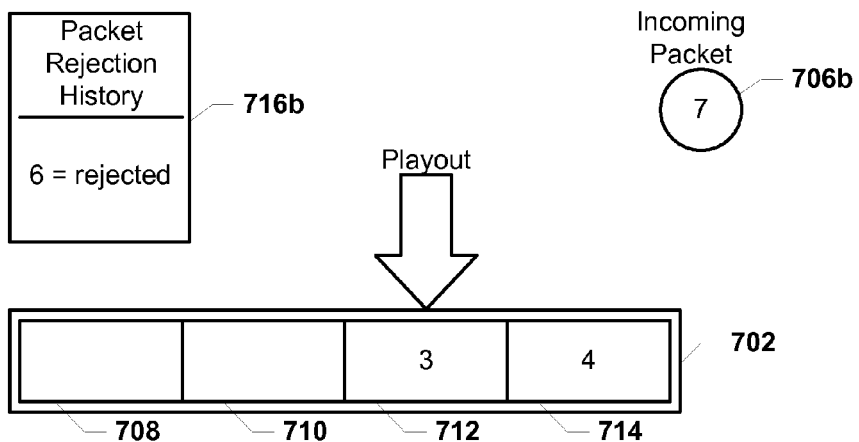
Figure 7C:
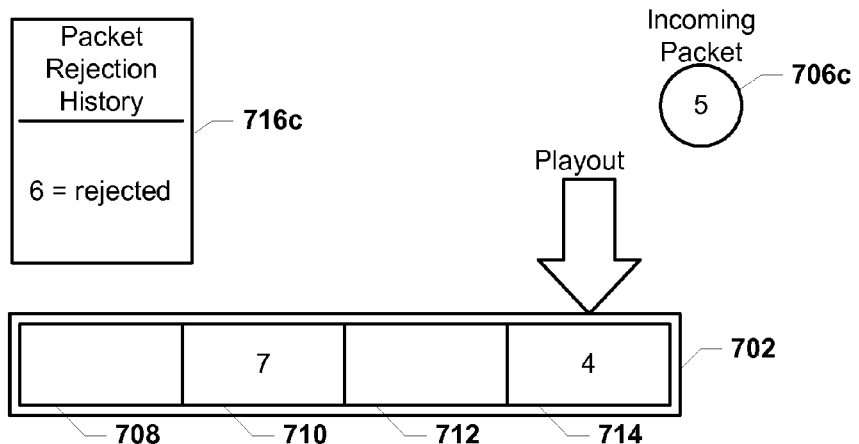

FIGS. 7A-7C illustrate examples of managing buffer space on an embodiment receiver device over a period of time by utilizing a packet rejection history. For ease of describing the process of managing packets in a buffer in the examples illustrated in FIGS. 7A-7C, packets are labeled with their sequence number. For example, "packet 8" represents the eighth packet in a sequence of packets.

FIG. 7A illustrates an example of buffer management in which the receiver device receives and rejects an incoming packet 6 706a. As illustrated in FIG. 7A, the receiver device may have previously received, accepted, and stored media packets 2, 3, and 4 sequentially in slots 710, 712, 714 of the buffer 702.

When incoming packet 6 706a arrives during playout of packet 2, the receiver device processor may determine whether there is room in the buffer to store the packet (i.e., whether to accept or reject the incoming packet 706a). As described above, the receiver device processor may determine that packet 4 was the last packet added to the buffer 702, and based on that determination, may determine that two free buffer slots are required to store the incoming packet 6 706a: one buffer slot for packet 5 (an out-of-order packet) and another buffer slot for the incoming packet 6 706a.

In an embodiment, the receiver device processor may check the packet rejection history 716a to determine the number of packets that have been rejected since packet 4 was added (i.e., the number of buffer slots that are actually needed to store the incoming packet 6 706a). As illustrated in FIG. 7A, when the packet rejection history 716a has no entries, the receiver device processor determines that no packets have been rejected since packet 4 was accepted, so the adjusted number of required free buffer slots will remain two (2=2−0): one free buffer slot for packet 5, should it arrive; and one free buffer slot for incoming packet 6 706a. In this situation, because the adjusted number of required free buffer slots (i.e., two) exceeds the actual number of free slots in the buffer (i.e., one), the receiver device processor may reject incoming packet 6 706a and update the packet rejection history 716a to record the rejection of incoming packet 6 706a as illustrated in packet rejection history 716b in FIG. 7B.

FIG. 7B continues the example with reception of the next packet, which is incoming packet 7 706b. In the example illustrated in FIG. 7B, the receiver device has finished playing out packet 2, thereby freeing up buffer slot 710. Thus, the buffer 702 now has two available (i.e., free) slots when incoming packet 7 706b arrives.

Upon receiving the next incoming packet 7 706b, the receiver device processor determines from the packet's sequence number (7) and the sequence number of the last-buffered packet (4) that the number of free buffer slots required to store incoming packet 7 706b is three (i.e., packet 7−packet 4=3 free buffer slots required). The receiver device processor again checks the packet rejection history 716b to determine the number of packets that have been rejected between packet 4 and the incoming packet 7 706b. In this case, based on the packet rejection history 716b, the receiver device processor determines that there was one rejection (i.e., packet 6) between packet 4 and the incoming packet 7 706b. Based on this information, the receiver device processor calculates that adjusted number of required free buffer slots is two because packet 6 has already been rejected, meaning that the buffer 702 only needs two buffer slots: one to store packet 5, should it ever arrive; and one to store the incoming packet 7 706b. The receiver device processor may then determine that the buffer 702 has room to store incoming packet 7 706b because buffer slots 708, 710 are free.

After determining that there is room in the buffer to store the incoming packet 7 706b, the receiver device processor may store the incoming packet 7 706b in the buffer in a slot off set from the slot storing the last-buffered packet based on the adjusted number of required free buffer slots calculated above (i.e., 2). Thus, the receiver device processor may store the incoming packet 7 706b in buffer slot 710 because buffer slot 710 is two slots in the buffer after packet 4's slot (i.e., buffer slot 714), thereby keeping the buffer in sequential order.

FIG. 7C continues the example with reception of the next packet, which is incoming packet 5 706c that is received out of order. In the example illustrated in FIG. 7C, the receiver device has finished playing packet 3 in buffer slot 712, thereby freeing up buffer slot 712, and begun playout of packet 4 stored in buffer slot 714.

When the incoming packet 5 706c arrives, the receiver device processor determines from the packet's sequence number (5) and the sequence number of the last-buffered packet (7) that the number of free buffer slots required to store incoming packet 5 706c is −2 (i.e., packet 5−packet 7=−2). As described above with reference to FIG. 5, when a packet arrives out of order (i.e., after a packet with a higher sequential number is stored in the buffer), the receiver device processor may have already left space in the buffer for that out-of-order packet. Thus, in the example illustrated in FIG. 7B, the receiver device processor left room in the buffer 702 for incoming packet 5 706c when storing incoming packet 7 706b in the buffer 702.

In an embodiment, to determine slot of the buffer 702 in which to store the incoming packet 5 706c, the receiver device processor may adjust the number of required free buffer slots to account for the rejected packets between incoming packet 5 706c and the last-buffered packet 7 (i.e., the last packet added to the buffer). By checking the packet rejection history 716c, the receiver device processor determines that one packet (i.e., packet 6) was rejected and may add one to the number of required free buffer slots to generate a slot index offset of −1 (i.e., −2 required free buffer slots+1 rejected packet=−1). The slot index offset of −1 may be used by the receiver device processor to determine that incoming packet 5 706c should be stored in buffer slot 708, because buffer slot 708 is one slot before buffer slot 710 in which the last-buffered packet (i.e., packet 7) is stored.

In a variety of circumstances, the receiver device's buffer for storing media packets may become full with received packets awaiting playout such that incoming packets must be rejected because there is no space in which to store those packets. In this situation, the receiver device's voice playback may be significantly degraded because numerous packets must be rejected. In another circumstance, the receiver device's buffer may also become constrained/full to the point in which the buffer may have space to store a few incoming packets, but sequences of packets carrying meaningful information cannot be stored in the buffer, thereby causing spotty or choppy playout because only a few packets are able to be successfully stored.

Further embodiments resolve such performance issues by providing buffer space management methods that may be implemented by the receiver device processor in response to determining that there is no or insufficient space left in the buffer to accommodate incoming packets. The embodiment providing buffer space management methods include actions that delete stored packets or reject incoming packets in a manner that minimizes potential impacts on the user experience by taking advantage of information included within the packets.

Figure 8:
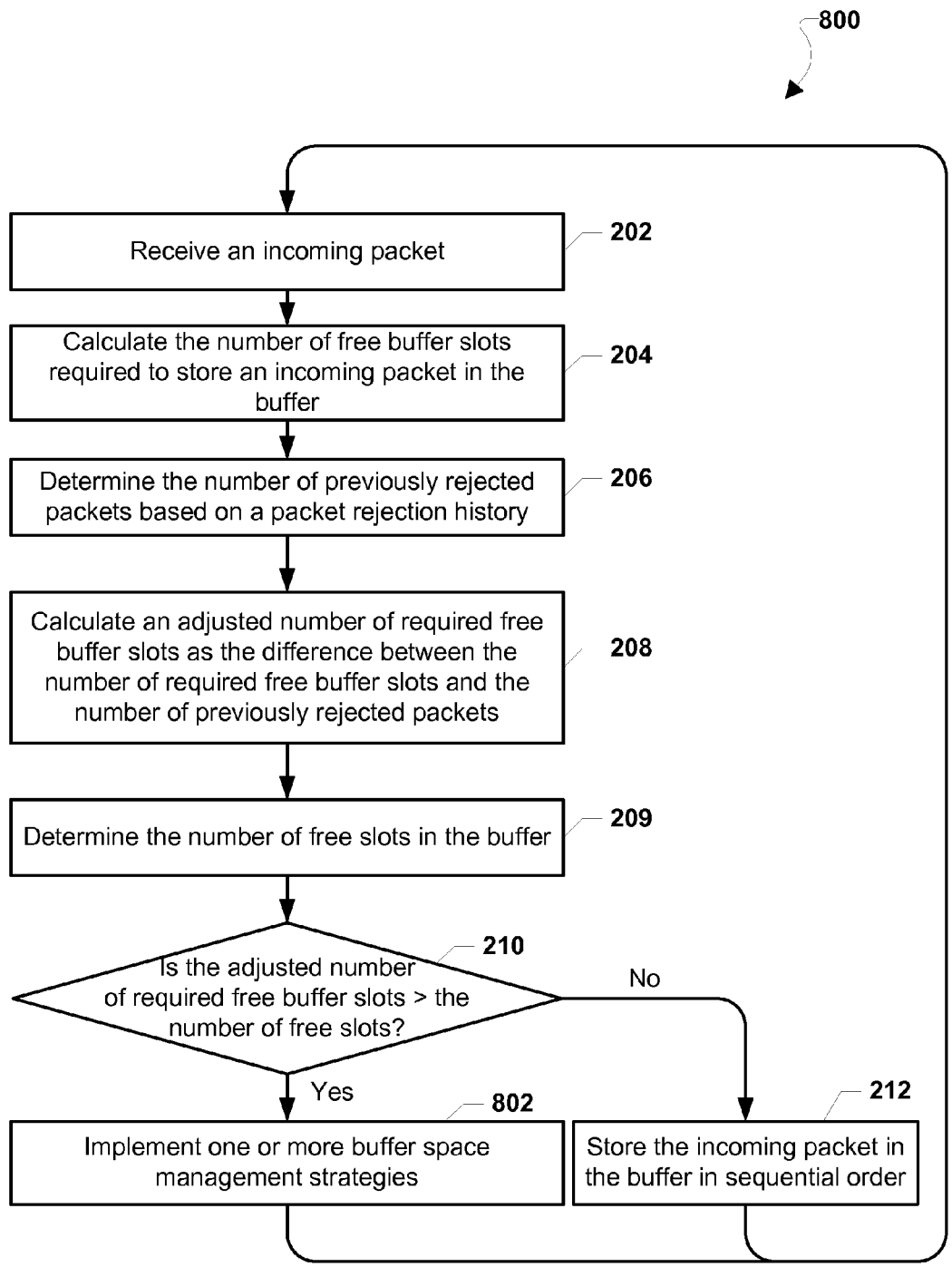
FIG. 8 is a process flow diagram of an embodiment method for implementing one or more buffer space management strategies when the receiver device's buffer is full.

FIG. 8 illustrates an embodiment method 800 that may be implemented by a processor on a receiver device for determining when to implement one or more buffer space management strategies based on whether there is insufficient space in the buffer to store an incoming packet. The operations of method 800 include several of the operations of embodiment method 200 described above with reference to FIG. 2. Thus, the receiver device may receive an incoming packet in block 202, calculate the number of free buffer slots required to store the incoming packet in the buffer in block 204, determine the number of previously rejected packets since the last-buffered packet based on a packet rejection history in block 206, calculate an adjusted number of free buffer slots required to store the incoming packet in the buffer as the difference between the required free buffer slots and the number of previously rejected packets in block 208, and determine the actual number of free slots in the buffer using known methods in block 209 as described above with reference to FIG. 2.

In determination block 210, the receiver device processor may determine whether the adjusted number of required free buffer slots calculated in block 208 exceeds the actual number of free slots in the buffer determined in block 209 in order to assess whether the buffer has sufficient space to store the incoming packet as described above.

When the receiver device processor determines that the adjusted number of required free buffer slots does not exceed the actual number of free slots in the buffer (i.e., determination block 210="No"), the receiver device processor may store the incoming packet in the buffer in sequential order in block 212 as described above.

When the receiver device processor determines that the adjusted number of required free buffer slots exceeds the actual number of free slots in the buffer (i.e., determination block 210="Yes"), the processor may implement one or more buffer space management strategies in block 802 and as described below with reference to FIGS. 9-13 in order to free up space in the buffer to store incoming packets. After either implementing one or more buffer space management strategies in block 802 or after storing the incoming packet in the buffer in block 212, the receiver device processor may repeat the operations described above for subsequent incoming packets by receiving the next incoming packet in block 202.

Figure 9:
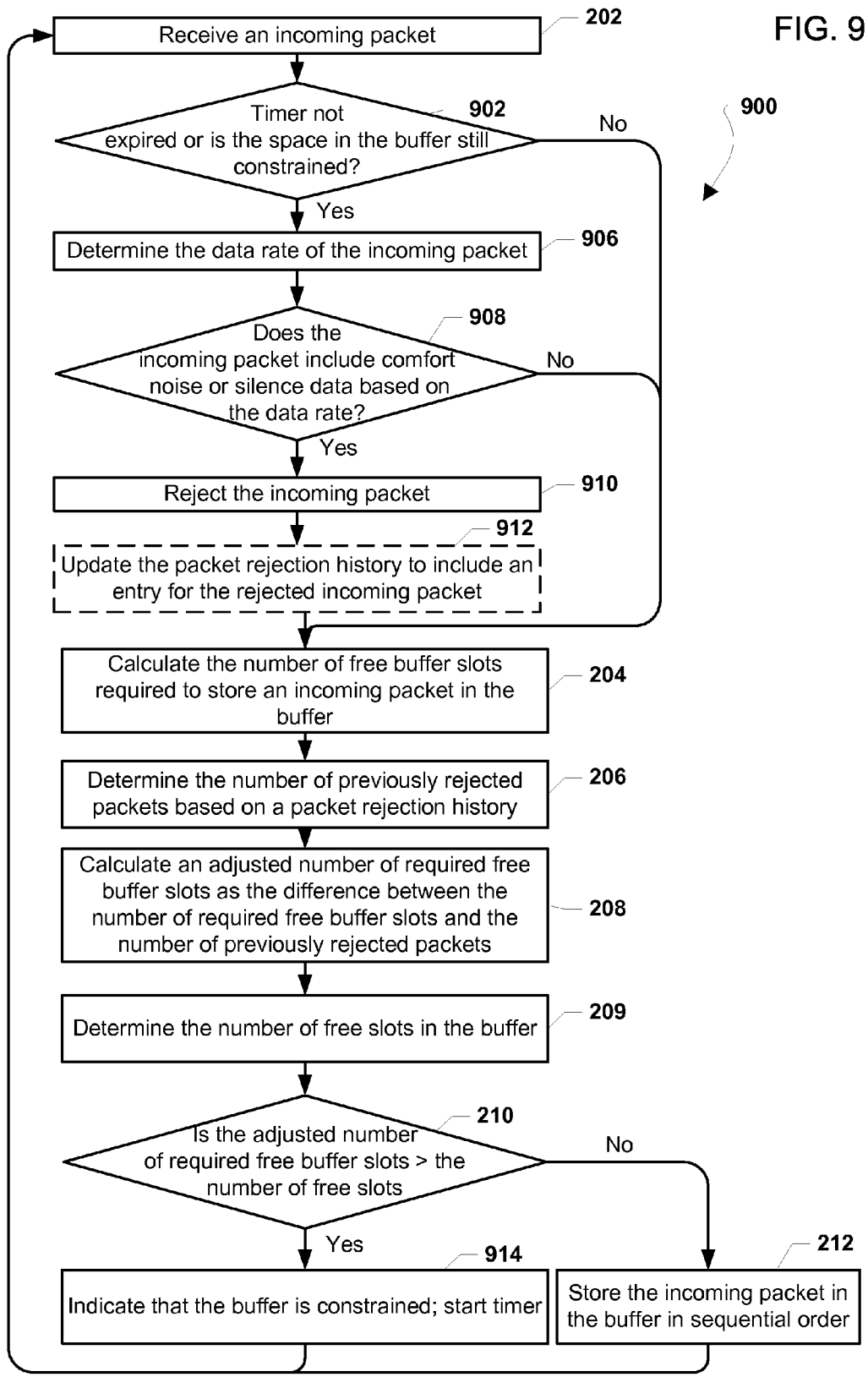
FIG. 9 is a process flow diagram of an embodiment method for preemptively rejecting incoming packets that include silence or comfort noise data.

FIG. 9 illustrates an embodiment method 900 that may be implemented by a processor on a receiver device for selectively rejecting media packets that include silence or comfort noise data when space in the buffer is constrained. The operations of method 900 implement an embodiment of the operations of block 802 in method 800 described with reference to FIG. 8. However, rather than reacting to a single packet, the operations of method 900 may be implemented for a period of time or so long as the buffer is constrained. In this embodiment, the receiver device processor may preferentially store incoming packets including voice data in the buffer and reject incoming packets that contain silence or comfort noise data when the available space in the buffer is limited to maintain an acceptable quality of audio playout on the receiver device. Thus, the method 900 implements packet screening operations (blocks 906-912) on packets after reception in block 202 but before the other operations of method 800 are performed as described above. These packet screening operations may be initiated when the receiver device processor determines that the adjusted number of required free buffer slots exceeds the actual number of free slots (i.e., determination block 210="Yes"), by setting an indicator (e.g., a status flag) and/or starting a timer indicating that the buffer is in a constrained state in block 914.

The receiver device may receive an incoming packet in block 202 as described above with reference to FIGS. 2 and 8. In determination block 902, the receiver device processor may determine whether the space in the buffer is constrained as may be indicated by a status flag set and/or timer started in block 914. In an embodiment, the receiver device processor may also or alternatively directly check the status of the buffer (e.g., by querying a memory management unit managing the buffer) to determine whether the amount of free space or slots is less than a predefined minimum below which performance could be impacted. When the receiver device processor determines that the space in the buffer is not constrained (i.e., determination block 902="No"), because a constrained flag is not set or a timer on the filtering operation has expired, the processor may execute the operations of blocks 204-212 as described above with reference to FIG. 8.

When the receiver device processor determines that the space in the buffer is still constrained (i.e., determination block 902="Yes"), the processor may determine the data rate of the incoming packet in block 906, such as by determining the frame rate, bit rate, and or other capacity operating scheme of the media packet. For example, the received incoming packet may have a full frame rate (i.e., significant/meaningful data, such as voice data), a half frame rate (i.e., somewhat significant data), or an eighth frame rate (e.g., silence or comfort noise). In an embodiment, the receiver device processor may determine the data rate of the incoming packet based on metadata included within the packet, such as by identifying the codec associated with the packet (e.g., an enhanced variable rate codec (EVRC)), or by analyzing other information included in the packet as described in RFC 3558, "RTP Payload Format for Enhanced Variable Rate Codecs (EVRC) and Selectable Mode Vocoders (SMV)" (2003).

In determination block 908, the receiver device processor may determine whether the incoming packet includes comfort noise or silence data based on the data rate determined in block 906. Typically, voice activation detection components operating in a VoIP system analyze the frequency of audio received from a microphone and generate comfort noise (i.e., a synthetic background noise to fill silence) or silence when the audio is not within an audible frequency. Packets that include silence and comfort noise data have lower frame/bit rates (e.g., a one-eighth frame rate) than media packets that include meaningful/voice data (e.g., media packets with full- or half-frame rates).

When the receiver device processor determines that the incoming packet does not include comfort noise or silence data (i.e., determination block 908="No"), the processor may attempt to store the media packet in the buffer by performing the operations in blocks 204-212 as described above with reference to FIG. 2 and FIG. 8 because the incoming packet may include meaningful voice data.

When the receiver device processor determines that the incoming packet includes comfort noise or silence data (i.e., determination block 908="Yes"), the processor may reject the incoming packet in block 910. In contrast to conventional VoIP systems that discard silence and comfort noise media packets only to improve latency (e.g., latency shedding), the receiver device processor may preferentially discard silence and comfort noise media packets to increase available buffer space. Thus, in an embodiment, the receiver processor device may not alter or otherwise disrupt the receiver device's playout speed/pace by discarding the incoming packet. Instead, the receiver process device may leverage information about the incoming packet to significantly improve the amount of available space in the buffer, thereby increasing the likelihood that the processor may be able to store higher priority media packets—such as those packets carrying full-frame voice data—in the buffer.

In an optional embodiment, the receiver device processor may also update the media packet rejection history to include an entry for the rejected incoming packet in optional block 912 to ensure that space in the buffer is not reserved for the rejected incoming packet as described above with reference to FIG. 2. The receiver device processor may then repeat the process by receiving the next packet in block 202 as described above with reference to FIG. 2 and FIG. 8.

The operations of method 900 may be implemented for a period of time determined by a timer set the receiver device processor upon determining that the buffer is near capacity (i.e., determination block 210="Yes") so that the preferential filtering is performed for a limited amount of time. Alternatively, the packet filtering operations of method may be implemented on a packet-by-packet basis according to an instantaneous status of the buffer determined in determination block 902 as described above.

Figure 10:
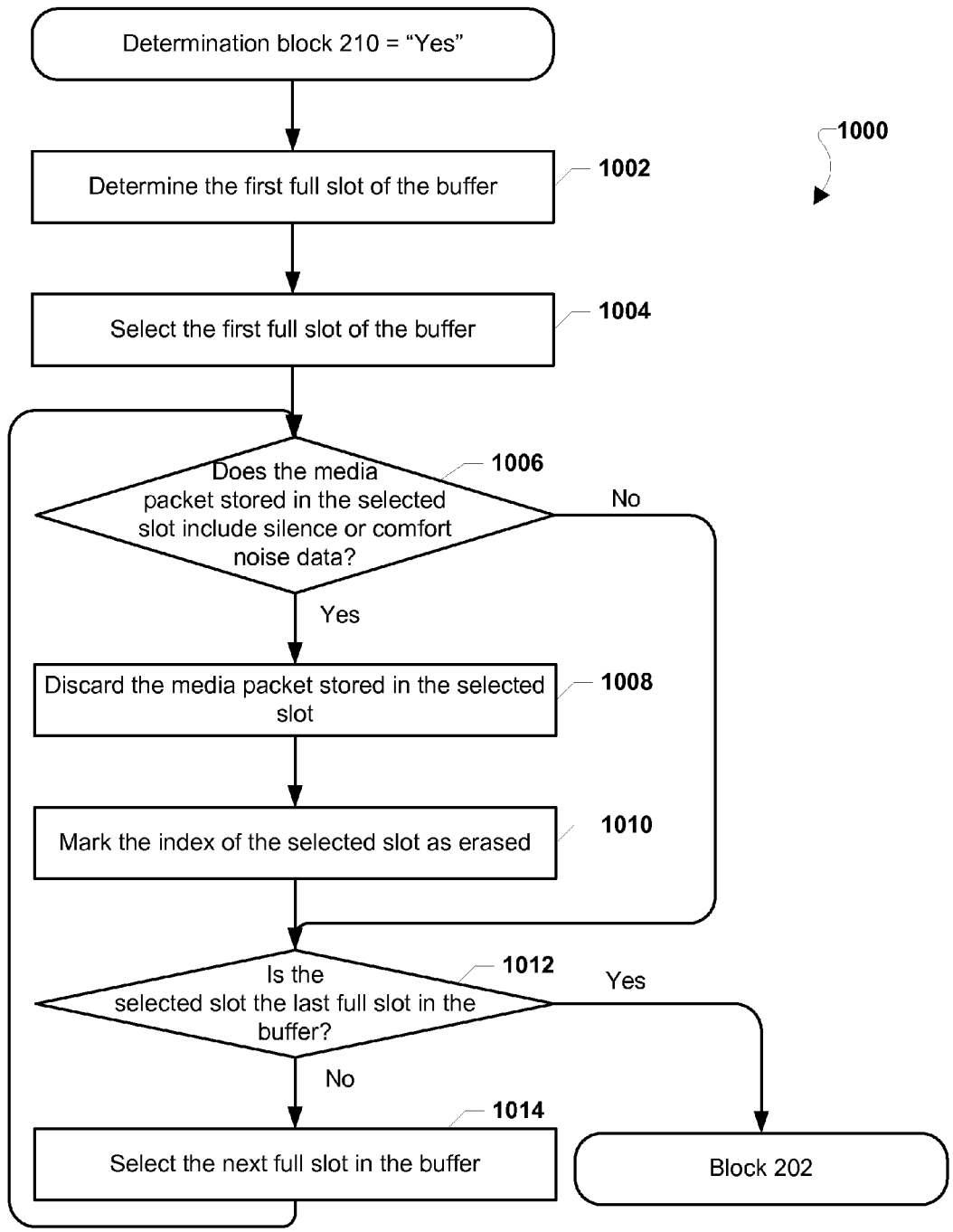
FIG. 10 is a process flow diagram of an embodiment method for discarding media packets stored in the buffer when those packets include silence or comfort noise data.

FIG. 10 illustrates an embodiment method 1000 that may be implemented by a processor on a receiver device to make room in a full or nearly full buffer for storing incoming packets by discarding media packets that include silence or comfort noise data. The operations of method 1000 implement an embodiment of the operations of block 802 of method 800 described with reference to FIG. 8. Thus, the receiver device processor may begin performing method 1000 after determining that the buffer is full or nearly full, such as when the adjusted number of required free buffer slots exceeds the actual number of free slots (i.e., determination block 210="Yes").

As described above with reference to FIG. 9, media packets including silence or comfort noise data may take up considerable space in the buffer without contributing to the quality of playout. For example, four seconds of silence or comfort noise stored in the buffer could potentially prevent four seconds of meaningful voice data from being stored in the buffer when the buffer is full, which could degrade the voice quality of playout on the receiver device. In this embodiment, the receiver device processor may purge the buffer of silence and comfort noise to make room for packets carrying voice data.

In block 1002, the receiver device processor may determine the first full slot of the buffer. For example, the receiver device processor may perform a table look up or follow a pointer stored in memory that points to the beginning of the buffer and may begin scanning the buffer until the processor discovers the first buffer slot that includes a media packet. The receiver device processor may also select the first full slot of the buffer in block 1004.

In determination block 1006, the receiver processor device may determine whether the media packet stored in the selected buffer slot includes silence or comfort noise data. For example, the receiver processor device may determine whether the media packet has a low frame rate or bit rate indicative of silence or comfort noise data (e.g., an eighth-frame rate) as described above in determination block 908 of method 900 described with reference to FIG. 9.

When the receiver device processor determines that the media packet stored in the selected slot does include silence or comfort noise data (i.e., determination block 1006="Yes"), the processor may discard the media packet stored in the selected slot in block 1008. The receiver device processor may also mark the index of the selected slot as erased in block 1010. As mentioned above with reference to FIG. 9, conventional VoIP systems typically throw away silence or comfort noise data in order to improve latency by skipping over silent media packets to increase the rate at which the media packets in the buffer are played out. However, the embodiment method 1000 differs from conventional VoIP systems by discarding silent or comfort noise media packets without affecting the device's playout rate.

After the slot index has been updated to reflect an erased packet or when the receiver device processor determines that the media packet stored in the selected slot does not include silence or comfort noise data (i.e., determination block 1006="No"), the receiver device processor may determine whether it has finished scanning through the buffer by determining whether the selected slot is the last full slot in the buffer in determination block 1012. For example, the receiver device processor may continue scanning the buffer from the selected buffer slot to determine whether there is another full slot in the buffer. When the receiver device processor determines that the selected slot is not the last full slot in the buffer (i.e., determination block 1012="No"), the processor may select the next full slot in the buffer in block 1014 and repeat the above operations of determining whether the packet in the selected slot contains silence or comfort noise in determination block 1006. When the receiver device determines that the selected slot is the last full slot in the buffer (i.e., determination block 1012="Yes"), the processor may continue receiving incoming packets in block 202 of method 200 as described above with reference to FIG. 2.

Figure 11A:
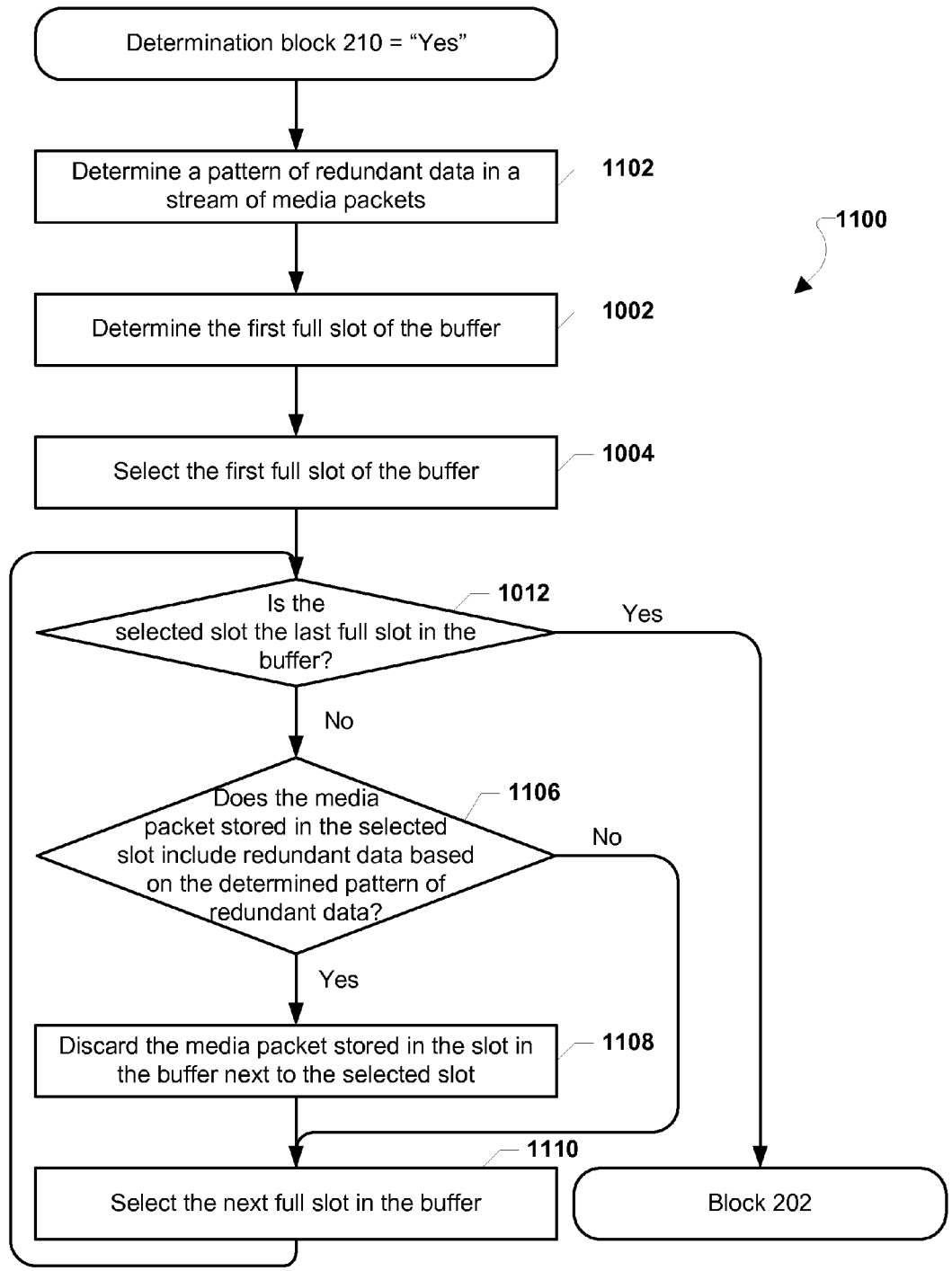
FIG. 11A is a process flow diagram of an embodiment method for discarding media packets in the buffer based on a determined pattern of redundant data.

FIG. 11A illustrates an embodiment method 1100 that may be implemented by a processor of a receiver device for discarding media packets in a full or nearly full buffer based on the media packets' proximity to redundant data stored in the buffer. The operations of method 1100 implement an embodiment of the operations of block 802 in method 800 described with reference to FIG. 8. Thus, the receiver device processor may begin performing method 1100 after determining that the buffer is full or nearly full, such as when the adjusted number of required free buffer slots exceeds the actual number of free slots (i.e., determination block 210="Yes").

Currently, codecs in VoIP systems include coefficient data (i.e., redundant data) at regular intervals in streams of media packets. This redundant data is additional audio data included in the media packet that the receiver device processor may use to recover or interpolate over missing media packets (i.e., to fill in gaps in audio by approximate the data of missing packets). For example, a receiver device processor may receive a first media packet in a sequence that includes redundant data and may use that redundant data to interpolate over a missing second media packet in the sequence that was lost in the network during transmission.

In the embodiment method 1100 illustrated in FIG. 11A, the receiver device processor may leverage its existing ability to use redundant data to interpolate over missing packets to increase available space in the buffer. In an embodiment, the receiver device processor may discard media packets to free up space in the buffer for storing subsequent packets, and rely on error correction or interpolation to compensate for the discarded media packets to maintain an acceptable playout quality (i.e., to fill in audio gaps caused by discarding the packets).

In block 1102, the receiver device processor may determine a pattern of redundant data in a stream of media packets, such as from observing media packets over a period of time. Recognizing the pattern of redundant data in a stream of media packets may enable the processor to identify media packets stored in the buffer that include redundant data and, thus, identify the media packets in the buffer that can be interpolated over and thus discarded without a significant impact to the playout sound quality. Each particular codec may add redundant data to media packet streams differently (e.g., adding redundant data to every third media packet), and the receiver device processor may discover the pattern of redundant data using various methods, such as the methods described below with reference to FIGS. 11B and 11C. The receiver device processor may also determine the first full slot of the buffer in block 1002 and select the first full slot of the buffer in block 1004 as described above with reference to FIG. 10.

In determination block 1012, the receiver device processor may determine whether the selected slot is the last full slot in the buffer as described above with reference to FIG. 10. When the receiver device processor determines that the selected slot is the last full slot in the buffer (i.e., determination block 1012="Yes"), the processor may continue receiving incoming packets in block 202 of methods 200 and 800 as described above with reference to FIG. 2 and FIG. 8.

When the receiver device processor determines that the selected slot is not the last full slot in the buffer (i.e., determination block 1012="No"), the processor may use the pattern of redundant data determined above in block 1102 to determine whether the media packet stored in the selected slot includes redundant data in determination block 1106. In an embodiment, the receiver device processor may analyze metadata or headers included in the media packet stored in the selected buffer slot to identify whether the media packet includes redundant data. For example, the receiver device processor may determine whether a media packet includes bits (e.g., payload bits, marker bits, mode bits, etc.) with certain values that indicate the presence of redundant data. In another embodiment, the receiver device processor may identify whether the media packet stored in the selected slot includes redundant data based on its order or sequence in the buffer (e.g., determining that every third media packet in a sequence of media packets stored in the buffer includes redundant data).

When the receiver device processor determines that the media packet stored in the selected slot does not include redundant data (i.e., determination block 1106="No"), the processor may select the next full slot in the buffer in block 1110, and the processor may continue scanning through the buffer until the processor determines that it has reached the end of the buffer (i.e., determination block 1012="Yes"). When the receiver device processor determines that the media packet stored in the selected slot does include redundant data (i.e., determination block 1106="Yes"), the processor may discard the media packet stored in the buffer slot next to the selected slot in block 1108. As described above, discarding the media packet may not significantly affect the quality of audio playout even when the discarded media packet includes quality audio because the redundant data may enable the receiver device processor to interpolate over the discarded media packet. Thus, the receiver device processor may free up slots in the buffer by discarding media packets that the processor is able to interpolate over while still maintaining an acceptable audio quality.

The receiver device processor may select the next full slot in the buffer in block 1110 as described above and continue analyzing media packets in the buffer as described above until the processor reaches the end of the buffer (i.e., determination block 1012="Yes"), at which point the processor may continue receiving incoming packets in block 202 of methods 200 and 800 as described above with reference to FIG. 2 and FIG. 8.

Figure 11B:
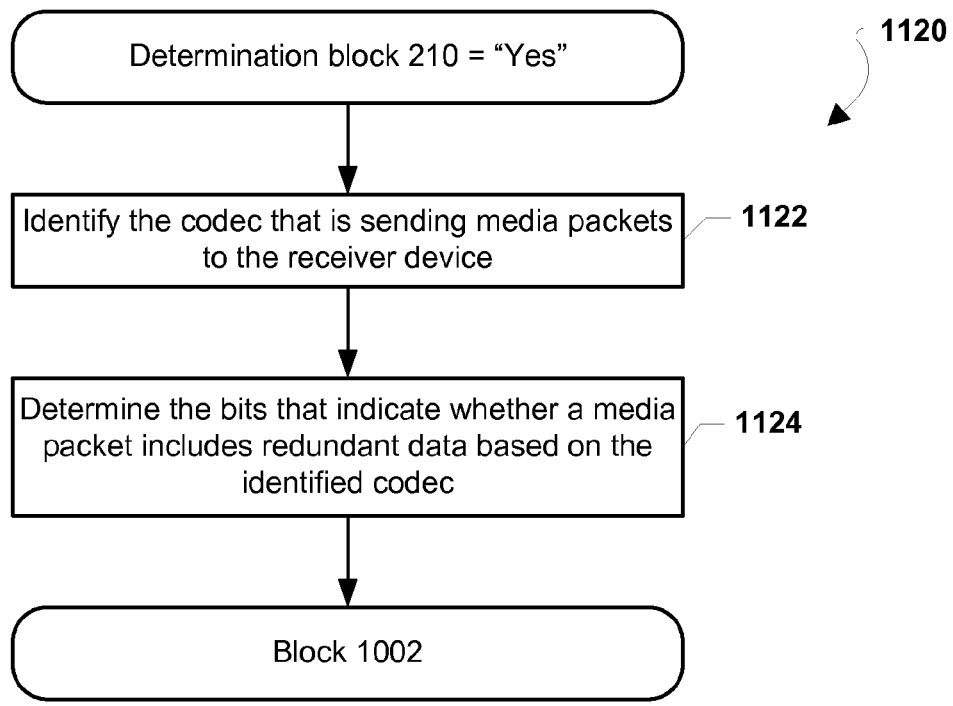
FIGS. 11B-C are process flow diagrams of embodiment methods for determining patterns of redundant data in a stream of media packets.

FIG. 11B illustrates an embodiment method 1120 that may be implemented by a processor on a receiver device for determining a pattern of redundant data in a media packet stream. The operations of method 1120 implement an embodiment of the operations of block 1102 of method 1100 described above with reference to FIG. 11A. Thus, the receiver device processor may begin performing method 1120 after determining that the buffer is full or nearly full, such as when the adjusted number of required free buffer slots exceeds the actual number of free slots (i.e., determination block 210="Yes").

In an embodiment, the receiver device processor may determine the pattern of redundant data in the stream of media packets based on information included in the media packets. In block 1122, the receiver device processor may identify the codec that is sending media packets to the device. In performing the operations of block 1122, the receiver device processor may receive one or more parameters as part of the real-time transport protocol ("RTP") that identify the codec currently sending media packets to the device. For example, the receiver device processor may receive a 7-bit "payload-type" field that the processor may use to identify the codec associated with the payload type identified by the field.

Because the identity of the codec alone may be insufficient to determine the media packets that include redundant data, the receiver device processor may determine the bits that indicate whether a media packet includes redundant data based on the identified codec in block 1124. In an embodiment, the receiver device processor may determine that bits that indicate redundant data in various ways. For example, the receiver device processor may access an expanded table of contents included in the RTP that identifies that bits that indicate redundant data for particular codecs (e.g., market bits, mode bits, etc.). In another example, the receiver device processor may receive a signal from the network that identifies the bits that indicate whether a media packet includes redundant data.

The processor may continue with method 1100 by determining the first full slot of the buffer in block 1002 as described above with reference to FIG. 11A.

Figure 11C:
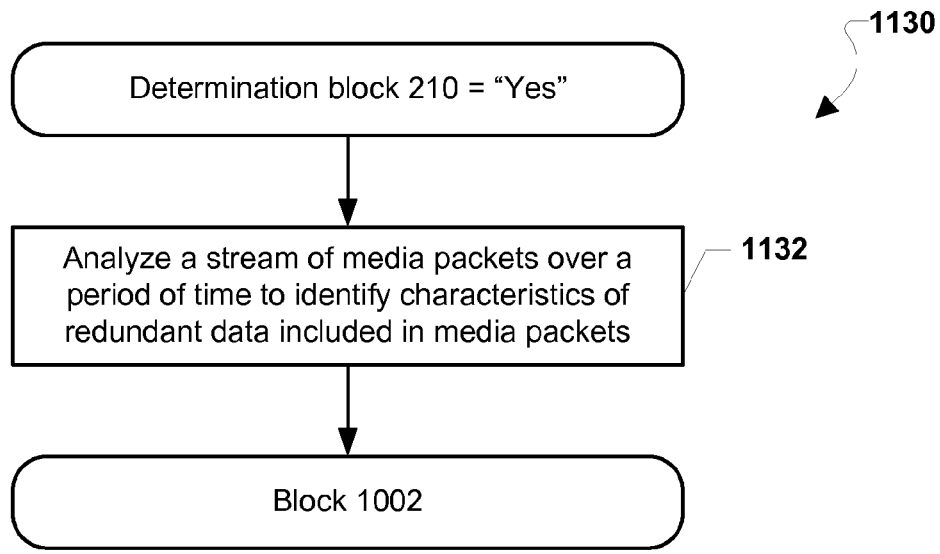

FIG. 11C illustrates an alternative embodiment method 1130 that may be implemented by a processor on a receiver device for determining a pattern of redundant data in a media packet stream. The operations of method 1130 implement an embodiment of the operations of block 1102 of method 1100 described above with reference to FIG. 11A. Thus, the receiver device processor may begin performing method 1130 after determining that the buffer is full or nearly full, such as when the adjusted number of required free buffer slots exceeds the actual number of free buffer slots (i.e., determination block 210="Yes").

In an embodiment, individual media packets may not include enough information for the receiver device processor to determine whether the media packet includes redundant data. For example, the codec and/or protocol used to send the media packets may not include bits or signals that indicate whether a particular media packet includes redundant data. In such a situation, the receiver device processor may analyze a stream of media packets over a period of time to identify characteristics of redundant data included in media packets in block 1132. In an embodiment, the receiver device processor may analyze incoming packets for several seconds to determine whether there is a recognizable pattern of interpolating over missing media packets. For example, the receiver device may recognize that a certain pattern of missing media packets are interpolated over, and from that pattern, the processor may identify the media packets that include redundant data. In another embodiment, the receiver device processor may identify commonalities among media packets that were used to interpolate over missing media packets. In an embodiment, the receiver device processor may utilize the identified characteristics of redundant data to identify media packets in the buffer that include redundant data as described above with reference to FIG. 11A.

In an embodiment, the method 1100 implemented in the receiver device processor may account for implementations in which the transmitting vocoder (i.e., the vocoder implemented on the transmitting device) stops sending data during silent periods (i.e., when the user is not speaking). For example, some vocoders (e.g., an adaptive multi-rate vocoder at a fixed rate) do not produce data to indicate whether a packet is audible or not. Instead, such vocoders may use discontinuous transmission (i.e., "DTX") when there are silent runs, such as by occasionally sending an SID frame as a silence identifier. In such situations and in an embodiment, the receiver device processor may detect one or more DTX gaps (i.e., silent runs) and may compute the number of free slots in the buffer that the silent run(s) equates to and where the silent run(s) would fit in the buffer. The receiver device processor may also adjust the positioning of the slots forward in the buffer based on the computed number of free slots in the buffer to leave more open slots in the buffer for receiving new incoming packets that contain quality/voice data.

The processor may then continue with method 1100 by determining the first full slot of the buffer in block 1002 as described above with reference to FIG. 11A.

Figure 12:
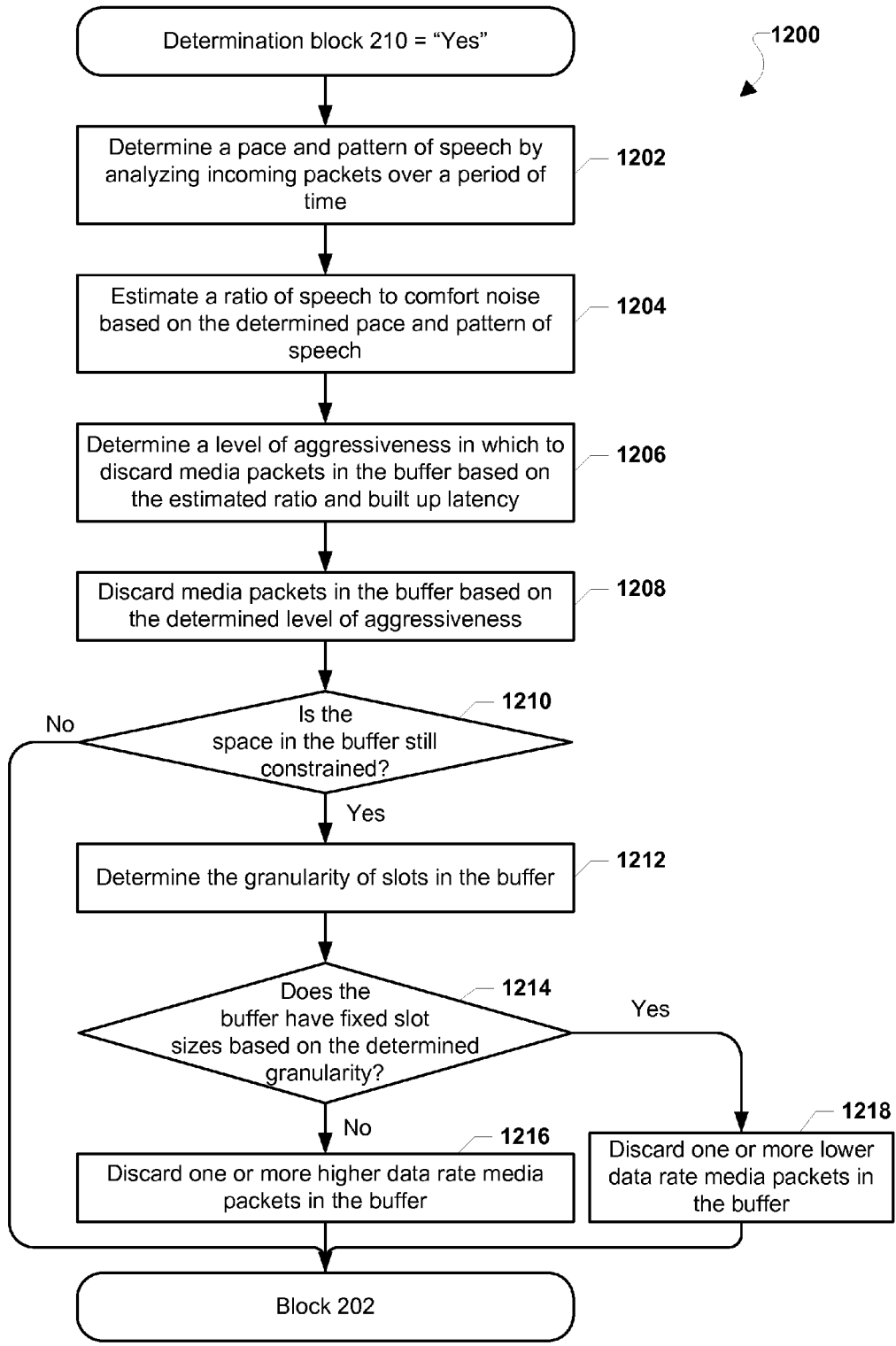
FIG. 12 is a process flow diagram of an embodiment method for discarding packets in the buffer based on an anticipated pace and pattern of incoming media packets.

FIG. 12 illustrates an embodiment method 1200 that may be implemented by a processor on a receiver device for discarding media packets in the buffer based on the pace and pattern of voice data expected to arrive in the near future. The operations of method 1200 implement an embodiment of the operations of block 802 in method 800 described with reference to FIG. 8. Thus, the receiver device processor may begin performing method 1200 after determining that the buffer is full or nearly full, such as when the adjusted number of required free buffer slots exceeds the actual number of free slots (i.e., determination block 210="Yes").

In an embodiment, when a receiver device's buffer is full or constrained, the receiver device processor may determine the number of media packets or the type of media packets to discard from the buffer by predicting the pace and pattern of incoming packets expected to arrive in the near future. By predicting the pace and pattern of incoming packets, the receiver device processor may free an appropriate amount of space to accommodate the anticipated number of incoming voice-containing packets.

In block 1202, the receiver processor device processor may determine a pace and pattern of speech by analyzing incoming packets over a period of time, such as one or two minutes. In an embodiment, the pace and pattern of speech may be based on the amounts and periodicity of speech and silence/comfort noise received over a period of time. Accordingly, in performing the operations of block 1202, the receiver processor device may determine the frame and/or bit rate of incoming packets over a period of time to determine the number, frequency and duration of media packets that include voice data (e.g., full frame/bit rates) and/or that include silence/comfort noise data (e.g., one-eighth frame/bit rates). In another embodiment (not shown), rather than determining the pace and pattern of speech dynamically (i.e., on the fly), the receiver device processor may determine the pace and pattern of speech based on a predetermined dialect of speech that may exhibit a characteristic or expected rate of speech and silence/comfort noise.

Based on the pace and pattern of speech determined in block 1202, the receiver device processor may estimate a ratio of speech to comfort noise packets in block 1204. In other words, the receiver device processor may predict that, consistent with the pace and pattern of speech observed so far, a certain percentage of incoming packets will include meaningful voice data instead of silence and/or comfort noise data. For example, the receiver device processor may expect 80% of incoming packets will include full-frame-rate voice data based on the analysis of incoming packets received over a period of time.

In block 1206, the receiver device processor may determine a level of aggressiveness in which to discard media packets in the buffer based on the estimated ratio as well as any degree of lag in the processing of the data stream due to a built-up latency. In other words, by estimating the ratio of incoming packets that include quality voice data, the processor may determine the types (e.g., full, half, or eighth frame/bit rate) and number of media packets in the buffer to discard to accommodate the expected number of incoming packets containing voice data. In the above example in which 80% of incoming packets may include voice data or full frame rates, the receiver device processor may determine that a high level of aggressiveness is required to free up enough space in the buffer to accommodate the high influx of media packets that include voice data. In another example in which only 20% of incoming packets are expected to include voice data/full frame rates, the receiver device may determine that a low level of aggressiveness is needed when freeing up space for the incoming packets.

In block 1208, the receiver device processor may discard media packets in the buffer based on the determined level of aggressiveness. As described above, the level of aggressiveness may indicate the types of media packets in the buffer that the receiver device processor may discard. In an embodiment, the receiver device processor may only target media packets of silence or comfort noise when the aggressiveness level is low, but the receiver device processor may also target media packets of high quality audio (e.g., half or even full frame/bit rate) as the level of aggressiveness rises. In another embodiment, the receiver device processor may discard a lower number of frames in the buffer when the aggressiveness level is lower than when the aggressiveness level is higher.

In another embodiment (not shown), in addition to or in lieu of discarding media packets in the buffer based on the determined level of aggressiveness in block 1208, the receiver device processor may simultaneously reject incoming packets that include silence or comfort noise data as generally described above with reference to FIG. 9.

In determination block 1210, the receiver processor device may determine whether space in the buffer is still constrained, such as by inspecting the buffer or comparing an amount of free space in the buffer to a threshold. In other words, the receiver device processor may determine whether it has discarded enough media packets in the buffer in block 1208 to accommodate expected incoming voice data packets. When the receiver processor device determines that the space in the buffer is not constrained (i.e., determination block 1210="No"), the processor may continue receiving incoming packets in block 202 of methods 200 and 800 as described above with reference to FIG. 2 and FIG. 8.

When the receiver device processor determines that the space in the buffer is still constrained (i.e., determination block 1210="Yes"), the processor may determine the granularity of slots in the buffer in block 1212. In other words, the processor may determine the manner in which media packets are stored in the buffer or how buffer memory is managed. For example, the media packets may be tightly packed, meaning that the media packets are stored in the buffers according to the size of the media packets. In such an example, media packets may take up variable amounts of space depending on their size. In another example, the media packets may be stored in buffer slots of a fixed size, meaning that each media packet takes up the same amount of space in the buffer based on the predetermined fixed size of the buffer slots. In determination block 1214, the receiver device processor may determine whether the buffer has fixed slot sizes.

When the receiver device processor determines that the buffer does have fixed slot sizes (i.e., determination block 1214="Yes"), the processor may discard one or more lower data rate media packets in the buffer in block 1218. Because each media packet takes up the same amount of space in the buffer, the receiver device processor may discard media packets that include lower-rate audio data (e.g., comfort noise, silence, and/or half-rate audio data) rather than higher-rate audio data to preserve the quality of audio playout. When the receiver device processor determines that the buffer does not have fixed slot sized (i.e., determination block 1214="No"), the processor may discard one or more higher data rate media packets in the buffer in block 1216, which may free up more space in the buffer than discarding lower-rate media packets as described above.

After discarding one or more media packets either in block 1216 or block 1218, the receiver device processor may continue receiving incoming packets in block 202 of method 200 as described above with reference to FIG. 2.

Figure 13:
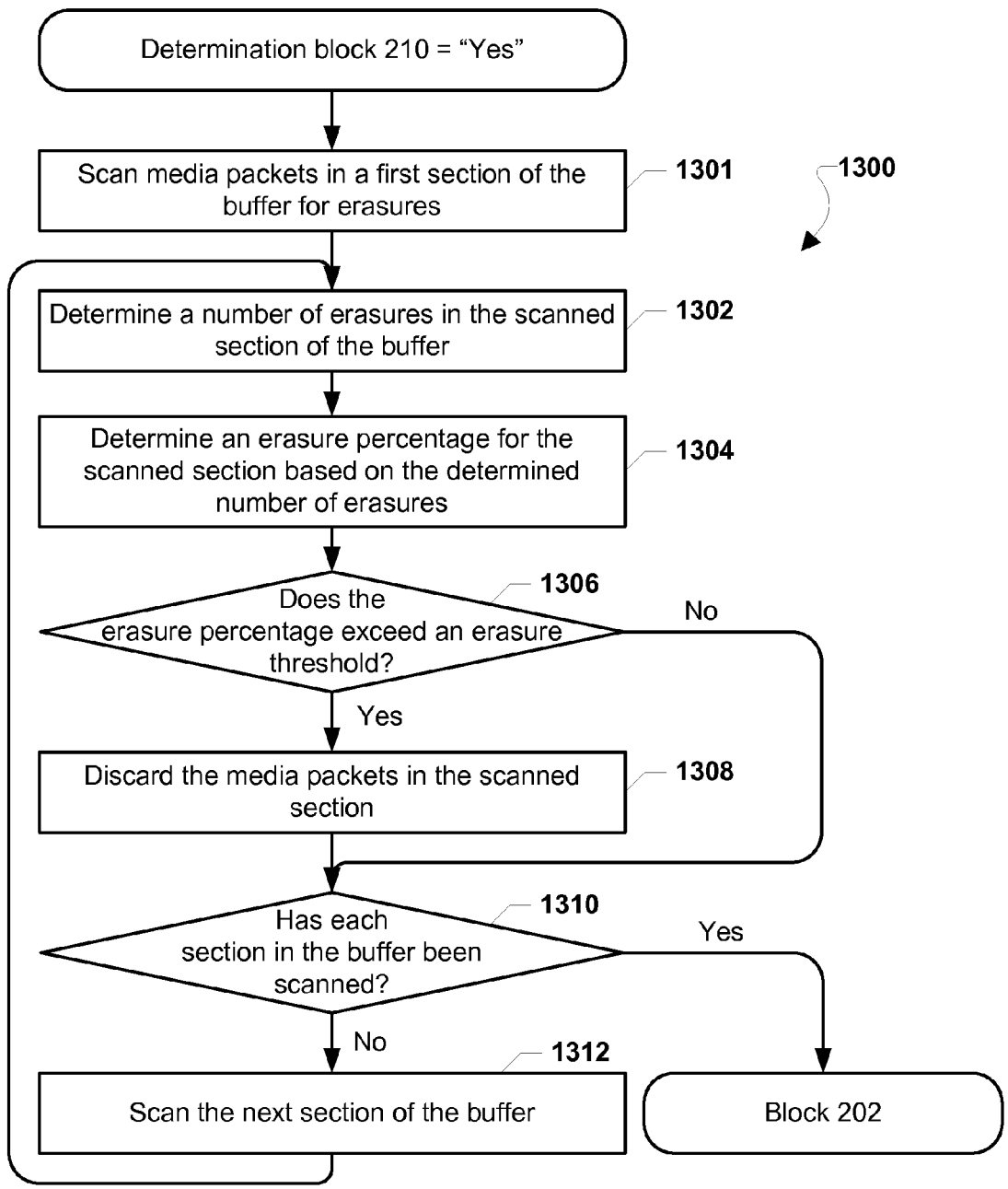
FIG. 13 is a process flow diagram of an embodiment method for discarding packets in a section of the buffer based on the number of erasures in that section.

FIG. 13 illustrates an embodiment method 1300 that may be implemented by a processor on a receiver device for discarding groups of media packets stored in the buffer when the group of media packets exceeds a threshold number of erasures. The operations of method 1300 implement an embodiment of the operations of block 802 in method 800 described above with reference to FIG. 8. Thus, the receiver device processor may begin performing method 1300 after determining that the buffer is full or nearly full, such as when the adjusted number of required free buffer slots exceeds the actual number of free slots (i.e., determination block 210="Yes").

Playing sections of the buffer that include a significant number of erasures (i.e., media packets that failed to be delivered over the network) may result in low quality, choppy playout even when the section otherwise includes high-quality audio. Thus, in an embodiment, the receiver device processor may potentially free significant space in the buffer by discarding media packets in one or more sections of the buffer that include a high number of erasures without significantly degrading the quality of the audio playout.

In block 1301, the receiver device processor may scan media packets in a first section of the buffer for erasures. The receiver device processor may also determine a number of erasures in the scanned section of the buffer in block 1302, such as by counting the number of media packets in the scanned section that were not received from the network. For example, after scanning media packet 1 to media packet 100 in the buffer, the receiver device processor may determine that thirty-four media packets did not arrive from the network. The receiver device processor may also determine an erasure percentage for the scanned section based on the determined number of erasures in block 1304 by determining how the number of total erasures in the section compares with the total number of media packets in the scanned section (e.g., an erasure percentage of 34% in the above example).

In determination block 1306, the receiver device processor may determine whether the erasure percentage exceeds an erasure threshold, which may indicate a minimally acceptable level of choppiness/audio quality. When the erasure percentage exceeds the erasure threshold (i.e., determination block 1306="Yes"), the processor may discard the media packets in the scanned section in block 1308. As described above, the receiver device processor may be unable to salvage the audio quality of a section of the buffer that has too many erasures regardless of the quality of the media packets that are stored in that section. Therefore, the receiver device processor may discard media packets in the entire section to save space without sacrificing quality audio.

After determining that the erasure percentage does not exceed the erasure threshold (i.e., determination block 1306="No") or after discarding the media packets in the scanned section in block 1308, the receiver device processor may determine whether each section in the buffer has been scanned in determination block 1310. In an embodiment, the receiver device processor may scan each section of the buffer in order to free up the most space possible for incoming packets.

When the receiver device processor determines that each section in the buffer has been scanned (i.e., determination block 1310="Yes"), the processor may continue receiving incoming packets in block 202 of methods 200 and 800 as described above with reference to FIG. 2 and FIG. 8. When the receiver device processor determines that each section in the buffer has not been scanned (i.e., determination block 1310="No"), the processor may scan the next section of the buffer in block 1312 and repeat the above operations for the next section until each section in the buffer has been scanned (i.e., until determination block 1310="Yes").

Figure 14:
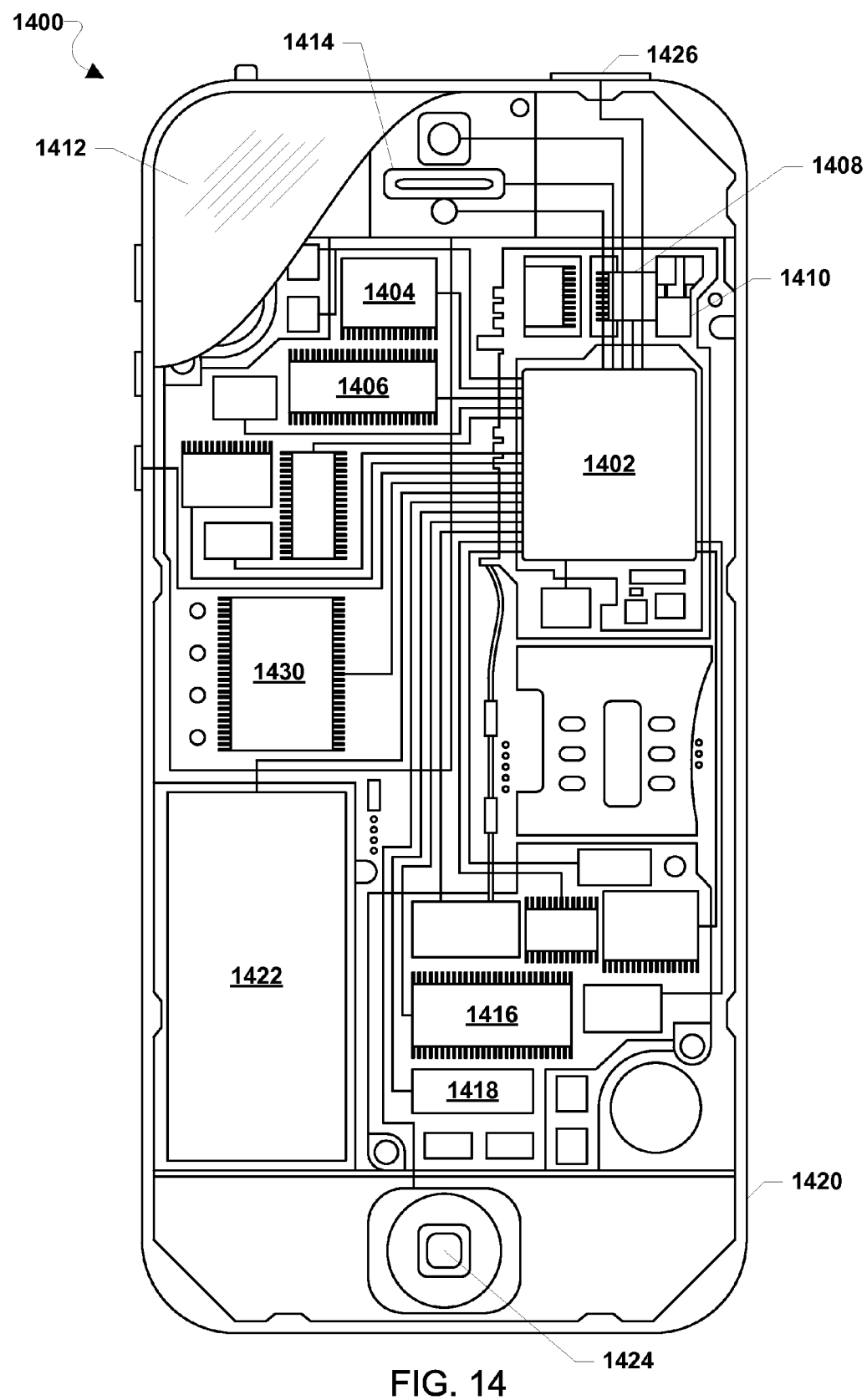
FIG. 14 is a component block diagram of an example receiver device according to an embodiment.

The various embodiments may be implemented in any of a variety of receiver devices, an example of which is illustrated in FIG. 14. The receiver device 1400 may include a processor 1402 coupled to a touchscreen controller 1404 and an internal memory 1406. The processor 1402 may be one or more multi-core integrated circuits designated for general or specific processing tasks. The internal memory 1406 may be volatile or non-volatile memory, and may also be secure and/or encrypted memory, or unsecure and/or unencrypted memory, or any combination thereof. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the receiver device 1400 need not have touch screen capability.

The receiver device 1400 may have one or more radio signal transceivers 1408 (e.g., Peanut, Bluetooth, Zigbee, Wi-Fi, RF radio) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The receiver device 1400 may include a cellular network wireless modem chip 1416 that enables communication via a cellular network and is coupled to the processor.

The receiver device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as USB, FireWire, Thunderbolt, or PCIe. The peripheral device connection interface 1418 may also be coupled to a similarly configured peripheral device connection port (not shown).

The receiver device 1400 may also include speakers 1414 for providing audio outputs. The receiver device 1400 may also include a housing 1420, constructed of a plastic, metal, or a combination of materials, for containing all or some of the components discussed herein. The receiver device 1400 may include a power source 1422 coupled to the processor 1402, such as a disposable or rechargeable battery. The rechargeable battery may also be coupled to the peripheral device connection port to receive a charging current from a source external to the receiver device 1400. The receiver device 1400 may also include a physical button 1424 for receiving user inputs. The receiver device 1400 may also include a power button 1426 for turning the receiver device 1400 on and off.

The receiver device 1400 may also include a SIM card 1430 that utilizes a cellular telephone transceiver 1408 and one or more antennae 1410 to connect to a mobile network. While not shown, in further embodiments, the receiver device 1400 may be a multi-SIM communication device and may include additional SIM cards that utilize one or more cellular telephone transceivers 1408 to respectively connect to additional mobile networks.

Figure 15:
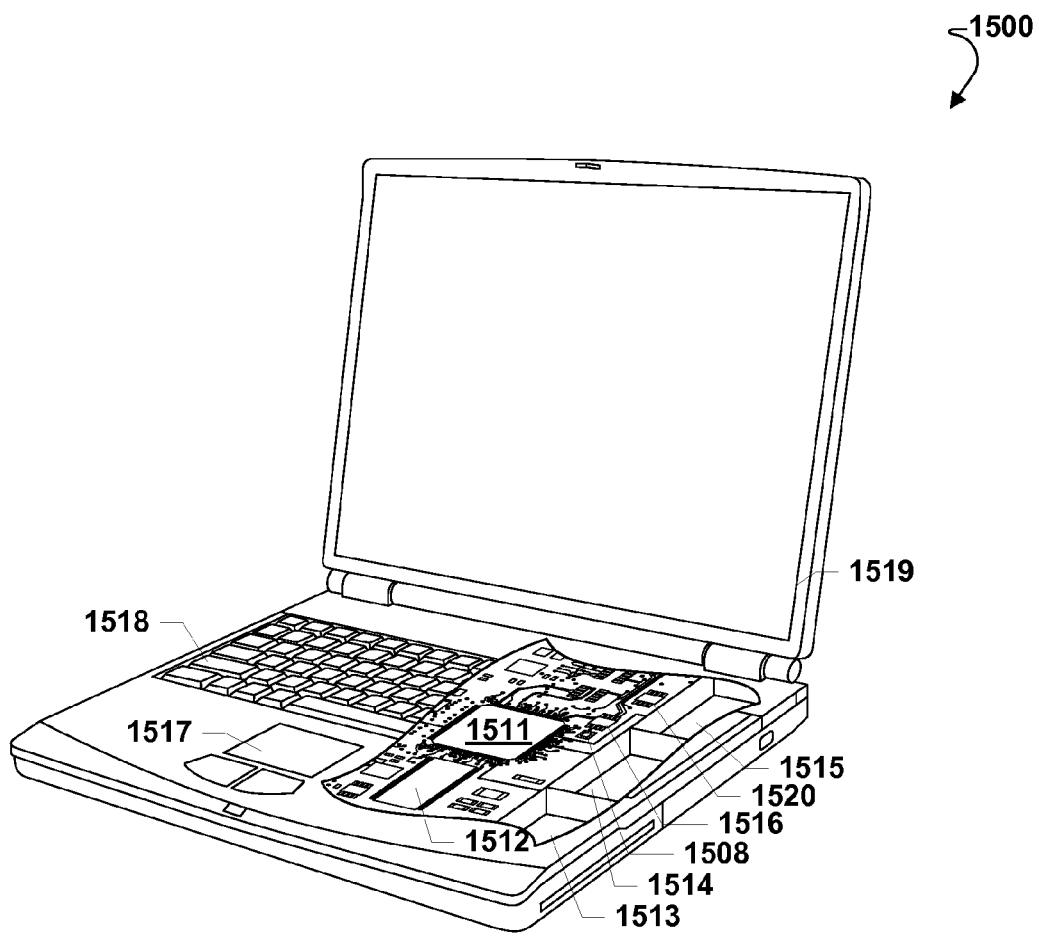
FIG. 15 is a component block diagram of another receiver device according to an embodiment.

The various embodiments described above may also be implemented within a variety of mobile communication devices, such as a laptop computer 1500 illustrated in FIG. 15. Many laptop computers include a touchpad touch surface 1517 that serves as the computer's pointing device, and thus may receive drag, scroll, and flick gestures similar to those implemented on receiver devices equipped with a touch screen display and described above. A laptop computer 1500 may include a processor 1511 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1511. The computer 1500 may also include a floppy disc drive 1514 and a compact disc (CD) drive 1515 coupled to the processor 1511. In a notebook configuration, the computer housing includes the touchpad 1517, the keyboard 1518, and the display 1519 all coupled to the processor 1511. Other configurations of the receiver device may include a computer mouse or trackball coupled to the processor (e.g., via a USB input) as are well known, which may also be use in conjunction with the various embodiments. The computer 1500 may have a SIM card 1520 that utilizes a cellular telephone transceiver 1516 and one or more antennae 1508 to connect to a first and a second mobile network, respectively. While not shown, in further embodiments, the mobile communication device 1500 may be a multi-SIM communication device and may include additional SIM cards that utilize one or more cellular telephone transceivers 1516 to connect to additional mobile networks.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium (i.e., stored processor-executable software instructions). The steps of a method or algorithm disclosed herein may be embodied in a processor-executable software module and may be performed as processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing buffer space on a voice over Internet Protocol (VoIP) receiver device comprising a buffer, comprising:

calculating a number of free buffer slots required to store an incoming packet in the buffer;

determining a number of previously rejected packets based on a packet rejection history;

calculating an adjusted number of required free buffer slots as a difference between the number of required free buffer slots and the number of previously rejected packets;

determining a number of free slots in the buffer;

determining whether the adjusted number of required free buffer slots exceeds the number of free slots;

implementing a buffer space management strategy in response to determining that the adjusted number of required free buffer slots exceeds the number of free slots in the buffer; and storing the incoming packet in the buffer in sequential order in response to determining that the adjusted number of required free buffer slots does not exceed the number of free slots.

2. The method of claim 1, wherein implementing a buffer space management strategy comprises:

determining whether space in the buffer is still constrained;

determining a data rate of an incoming packet in response to determining that the space in the buffer is still constrained;

determining whether the incoming packet includes one of comfort noise data and silence data based on the determined data rate; and rejecting the incoming packet in response to determining that the incoming packet includes one of comfort noise data and silence data.

3. The method of claim 1, wherein implementing a buffer space management strategy comprises:

selecting a full slot of the buffer;

determining whether a media packet stored in the selected slot includes one of silence data and comfort noise data;

discarding the media packet stored in the selected slot in response to determining that the media packet stored in the selected slot includes one of silence data and comfort noise data; and marking an index of the selected slot as erased in response to discarding the media packet stored in the selected slot.

4. The method of claim 1, wherein implementing a buffer space management strategy comprises:

determining a pattern of redundant data in a stream of media packets;

selecting a full slot of the buffer;

determining whether a media packet stored in the selected slot includes redundant data based on the determined pattern of redundant data; and discarding a media packet stored in a slot in the buffer next to the selected slot in response to determining that the media packet stored in the selected slot includes redundant data.

5. The method of claim 1, wherein implementing a buffer space management strategy comprises:
scanning media packets in a section of the buffer for erasures;
determining a number of erasures in the scanned section of the buffer;
determining an erasure percentage for the scanned section based on the determined number of erasures in the scanned section;
determining whether the erasure percentage exceeds an erasure threshold; and
discarding the media packets in the scanned section in response to determining that the erasure percentage exceeds the erasure threshold.

6. The method of claim 1, wherein implementing a buffer space management strategy comprises:
determining a pace and pattern of speech by analyzing incoming media packets over a period of time;
estimating a ratio of speech to comfort noise based on the determined pace and pattern of speech;
determining a level of aggressiveness in which to discard media packets in the buffer based on the estimated ratio and a built-up latency; and
discarding media packets in the buffer based on the determined level of aggressiveness.

7. The method of claim 6, further comprising:
determining whether space in the buffer is still constrained;
determining a granularity of slots in the buffer in response to determining that the space in the buffer is still constrained;
determining whether the buffer has fixed slot sizes based on the determined granularity;
discarding a higher data rate media packet in the buffer in response to determining that the buffer does not have fixed slot sizes; and
discarding a lower data rate media packet in the buffer in response to determining that the buffer does have fixed slot sizes.

8. A receiver device, comprising:
a transceiver configured to receive voice over Internet protocol (VoIP) media packets;
a memory configured to function as a buffer for received VoIP media packets; and
a processor coupled to the transceiver and the memory, wherein the processor is configured with processor-executable instructions to perform operations comprising:
calculating a number of free buffer slots required to store an incoming packet in the buffer;
determining a number of previously rejected packets based on a packet rejection history;
calculating an adjusted number of required free buffer slots as a difference between the number of required free buffer slots and the number of previously rejected packets;
determining a number of free slots in the buffer;
determining whether the adjusted number of required free buffer slots exceeds the number of free slots;
implementing a buffer space management strategy in response to determining that the adjusted number of required free buffer slots exceeds the number of free slots in the buffer; and
storing the incoming packet in the buffer in sequential order in response to determining that the adjusted number of required free buffer slots does not exceed the number of free slots.

9. The receiver device of claim 8, wherein the processor is configured with processor-executable instructions to perform operations such that implementing a buffer space management strategy comprises:
determining whether space in the buffer is still constrained;
determining a data rate of an incoming packet in response to determining that the space in the buffer is still constrained;
determining whether the incoming packet includes one of comfort noise data and silence data based on the determined data rate; and
rejecting the incoming packet in response to determining that the incoming packet includes one of comfort noise data and silence data.

10. The receiver device of claim 8, wherein the processor is configured with processor-executable instructions to perform operations such that implementing a buffer space management strategy comprises:
selecting a full slot of the buffer;
determining whether a media packet stored in the selected slot includes one of silence data and comfort noise data;
discarding the media packet stored in the selected slot in response to determining that the media packet stored in the selected slot includes one of silence data and comfort noise data; and
marking an index of the selected slot as erased in response to discarding the media packet stored in the selected slot.

11. The receiver device of claim 8, wherein the processor is configured with processor-executable instructions to perform operations such that implementing a buffer space management strategy comprises:
determining a pattern of redundant data in a stream of media packets;
selecting a full slot of the buffer;
determining whether a media packet stored in the selected slot includes redundant data based on the determined pattern of redundant data; and
discarding a media packet stored in a slot in the buffer next to the selected slot in response to determining that the media packet stored in the selected slot includes redundant data.

12. The receiver device of claim 8, wherein the processor is configured with processor-executable instructions to perform operations such that implementing a buffer space management strategy comprises:
scanning media packets in a section of the buffer for erasures;
determining a number of erasures in the scanned section of the buffer;
determining an erasure percentage for the scanned section based on the determined number of erasures in the scanned section;
determining whether the erasure percentage exceeds an erasure threshold; and
discarding the media packets in the scanned section in response to determining that the erasure percentage exceeds the erasure threshold.

13. The receiver device of claim 8, wherein the processor is configured with processor-executable instructions to perform operations such that implementing a buffer space management strategy comprises:
determining a pace and pattern of speech by analyzing incoming media packets over a period of time;

estimating a ratio of speech to comfort noise based on the determined pace and pattern of speech;

determining a level of aggressiveness in which to discard media packets in the buffer based on the estimated ratio and a built-up latency; and discarding media packets in the buffer based on the determined level of aggressiveness.

14. The receiver device of claim 13, wherein the processor is configured with processor-executable instructions to perform operations further comprising:

determining whether space in the buffer is still constrained;

determining a granularity of slots in the buffer in response to determining that the space in the buffer is still constrained;

determining whether the buffer has fixed slot sizes based on the determined granularity;

discarding a higher data rate media packet in the buffer in response to determining that the buffer does not have fixed slot sizes; and discarding a lower data rate media packet in the buffer in response to determining that the buffer does have fixed slot sizes.

15. A receiver device, comprising:

means for receiving voice over Internet protocol (VoIP) media packets;

buffering means for buffering received VoIP media packets;

means for calculating a number of free buffer slots required to store an incoming packet in the buffering means;

means for determining a number of previously rejected packets based on a packet rejection history;

means for calculating an adjusted number of required free buffer slots as a difference between the number of required free buffer slots and the number of previously rejected packets;

means for determining a number of free slots in the buffering means;

means for determining whether the adjusted number of required free buffer slots exceeds the number of free slots;

means for implementing a buffer space management strategy in response to determining that the adjusted number of required free buffer slots exceeds the number of free slots in the buffering means; and means for storing the incoming packet in the buffering means in sequential order in response to determining that the adjusted number of required free buffer slots does not exceed the number of free slots.

16. The receiver device of claim 15, wherein means for implementing a buffer space management strategy comprises:

means for determining whether space in the buffering means is still constrained;

means for determining a data rate of an incoming packet in response to determining that the space in the buffering means is still constrained;

means for determining whether the incoming packet includes one of comfort noise data and silence data based on the determined data rate; and means for rejecting the incoming packet in response to determining that the incoming packet includes one of comfort noise data and silence data.

17. The receiver device of claim 15, wherein means for implementing a buffer space management strategy comprises:

means for selecting a full slot of the buffering means;

means for determining whether a media packet stored in the selected slot includes one of silence data and comfort noise data;

means for discarding the media packet stored in the selected slot in response to determining that the media packet stored in the selected slot includes one of silence data and comfort noise data; and means for marking an index of the selected slot as erased in response to discarding the media packet stored in the selected slot.

18. The receiver device of claim 15, wherein means for implementing a buffer space management strategy comprises:

means for determining a pattern of redundant data in a stream of media packets;

means for selecting a full slot of the buffering means;

means for determining whether a media packet stored in the selected slot includes redundant data based on the determined pattern of redundant data; and means for discarding a media packet stored in a slot in the buffering means next to the selected slot in response to determining that the media packet stored in the selected slot includes redundant data.

19. The receiver device of claim 15, wherein means for implementing a buffer space management strategy comprises:

means for scanning media packets in a section of the buffering means for erasures;

means for determining a number of erasures in the scanned section of the buffering means;

means for determining an erasure percentage for the scanned section based on the determined number of erasures in the scanned section;

means for determining whether the erasure percentage exceeds an erasure threshold; and means for discarding the media packets in the scanned section in response to determining that the erasure percentage exceeds the erasure threshold.

20. The receiver device of claim 15, wherein means for implementing a buffer space management strategy comprises:

means for determining a pace and pattern of speech by analyzing incoming media packets over a period of time;

means for estimating a ratio of speech to comfort noise based on the determined pace and pattern of speech;

means for determining a level of aggressiveness in which to discard media packets in the buffering means based on the estimated ratio and a built-up latency; and means for discarding media packets in the buffering means based on the determined level of aggressiveness.

21. The receiver device of claim 20, further comprising:

means for determining whether space in the buffering means is still constrained;

means for determining a granularity of slots in the buffering means in response to determining that the space in the buffering means is still constrained;

means for determining whether the buffering means has fixed slot sizes based on the determined granularity;

means for discarding a higher data rate media packet in the buffering means in response to determining that the buffering means does not have fixed slot sizes; and means for discarding a lower data rate media packet in the buffering means in response to determining that the buffering means does have fixed slot sizes.

22. A non-transitory processor-readable storage medium having stored thereon processor-executable instructions configured to cause a processor of a receiver device to perform operations comprising:
- calculating a number of free buffer slots required to store an incoming voice over Internet protocol (VoIP) media packet in a buffer of the receiver device;
- determining a number of previously rejected packets based on a packet rejection history;
- calculating an adjusted number of required free buffer slots as a difference between the number of required free buffer slots and the number of previously rejected packets;
- determining a number of free slots in the buffer;
- determining whether the adjusted number of required free buffer slots exceeds the number of free slots;
- implementing a buffer space management strategy in response to determining that the adjusted number of required free buffer slots exceeds the number of free slots in the buffer; and
- storing the incoming packet in the buffer in sequential order in response to determining that the adjusted number of required free buffer slots does not exceed the number of free slots.

23. The non-transitory processor-readable storage medium of claim 22, wherein the stored processor-executable instructions are configured to cause a processor of a receiver device to perform operations such that implementing a buffer space management strategy comprises:
- determining whether space in the buffer is still constrained;
- determining a data rate of an incoming packet in response to determining that the space in the buffer is still constrained;
- determining whether the incoming packet includes one of comfort noise data and silence data based on the determined data rate; and
- rejecting the incoming packet in response to determining that the incoming packet includes one of comfort noise data and silence data.

24. The non-transitory processor-readable storage medium of claim 22, wherein the stored processor-executable instructions are configured to cause a processor of a receiver device to perform operations such that implementing a buffer space management strategy comprises:
- selecting a full slot of the buffer;
- determining whether a media packet stored in the selected slot includes one of silence data and comfort noise data;
- discarding the media packet stored in the selected slot in response to determining that the media packet stored in the selected slot includes one of silence data and comfort noise data; and
- marking an index of the selected slot as erased in response to discarding the media packet stored in the selected slot.

25. The non-transitory processor-readable storage medium of claim 22, wherein the stored processor-executable instructions are configured to cause a processor of a receiver device to perform operations such that implementing a buffer space management strategy comprises:
- determining a pattern of redundant data in a stream of media packets;
- selecting a full slot of the buffer;
- determining whether a media packet stored in the selected slot includes redundant data based on the determined pattern of redundant data; and
- discarding a media packet stored in a slot in the buffer next to the selected slot in response to determining that the media packet stored in the selected slot includes redundant data.

26. The non-transitory processor-readable storage medium of claim 22, wherein the stored processor-executable instructions are configured to cause a processor of a receiver device to perform operations such that implementing a buffer space management strategy comprises:
- scanning media packets in a section of the buffer for erasures;
- determining a number of erasures in the scanned section of the buffer;
- determining an erasure percentage for the scanned section based on the determined number of erasures in the scanned section;
- determining whether the erasure percentage exceeds an erasure threshold; and
- discarding the media packets in the scanned section in response to determining that the erasure percentage exceeds the erasure threshold.

27. The non-transitory processor-readable storage medium of claim 22, wherein the stored processor-executable instructions are configured to cause a processor of a receiver device to perform operations such that implementing a buffer space management strategy comprises:
- determining a pace and pattern of speech by analyzing incoming media packets over a period of time;
- estimating a ratio of speech to comfort noise based on the determined pace and pattern of speech;
- determining a level of aggressiveness in which to discard media packets in the buffer based on the estimated ratio and a built-up latency; and
- discarding media packets in the buffer based on the determined level of aggressiveness.

28. The non-transitory processor-readable storage medium of claim 27, wherein the stored processor-executable instructions are configured to cause a processor of a receiver device to perform operations further comprising:
- determining whether space in the buffer is still constrained;
- determining a granularity of slots in the buffer in response to determining that the space in the buffer is still constrained;
- determining whether the buffer has fixed slot sizes based on the determined granularity;
- discarding a higher data rate media packet in the buffer in response to determining that the buffer does not have fixed slot sizes; and
- discarding a lower data rate media packet in the buffer in response to determining that the buffer does have fixed slot sizes.

* * * * *